(12) United States Patent
Nonaka et al.

(10) Patent No.: US 7,849,282 B2
(45) Date of Patent: Dec. 7, 2010

(54) FILESYSTEM BUILDING METHOD

(75) Inventors: Yusuke Nonaka, Sagamihara (JP); Akira Yamamoto, Sagamihara (JP); Naoto Matsunami, Hayama (JP); Koji Sonoda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 124 days.

(21) Appl. No.: 11/266,206

(22) Filed: Nov. 4, 2005

(65) Prior Publication Data
US 2007/0061539 A1    Mar. 15, 2007

(30) Foreign Application Priority Data
Sep. 13, 2005    (JP) ............... 2005-265093

(51) Int. Cl.
*G06F 12/00* (2006.01)
*G06F 13/00* (2006.01)
*G06F 13/28* (2006.01)

(52) U.S. Cl. ..................................... 711/165
(58) Field of Classification Search ....................... None
See application file for complete search history.

(56) References Cited

U.S. PATENT DOCUMENTS

| | | | |
|---|---|---|---|
| 6,556,998 B1* | 4/2003 | Mukherjee et al. ............ 707/10 |
| 2003/0195895 A1* | 10/2003 | Nowicki et al. ............. 707/100 |
| 2004/0133540 A1 | 7/2004 | Saake et al. |
| 2004/0225659 A1* | 11/2004 | O'Brien et al. ................ 707/9 |
| 2004/0254907 A1* | 12/2004 | Crow et al. .................... 707/1 |
| 2006/0248038 A1* | 11/2006 | Kaplan et al. .................. 707/1 |

FOREIGN PATENT DOCUMENTS

| | | |
|---|---|---|
| JP | 2005-512171 | 4/2005 |
| JP | 2005-228170 | 8/2005 |

\* cited by examiner

*Primary Examiner*—Kevin L Ellis
*Assistant Examiner*—Chad L Davidson
(74) *Attorney, Agent, or Firm*—Antonelli, Terry, Stout & Kraus, LLP.

(57) ABSTRACT

To provide a technique whereby a plurality of types of storage media can be utilized in an efficient manner. A management apparatus includes a file manager that manages files within an integrated memory area that includes a first memory area composed of at least a part of the first type of storage medium and a second memory area composed of at least a part of the second type of storage medium. The file manager builds one filesystem on the integrated memory area, in consideration of a range of the first memory area and a range of the second memory area.

10 Claims, 19 Drawing Sheets

Fig.3

VOLUME MANAGEMENT TABLE TB

| LUN | FIRST MEMORY AREA MEDIUM TYPE | STARTING ADDRESS | ENDING ADDRESS | SECOND MEMORY AREA MEDIUM TYPE | STARTING ADDRESS | ENDING ADDRESS | ... | N-TH MEMORY AREA MEDIUM TYPE | STARTING ADDRESS | ENDING ADDRESS |
|---|---|---|---|---|---|---|---|---|---|---|
| 0 | FC | 0 | 999 | ATA | 1000 | 1999 | ... | — | — | — |
| 1 | FC | 0 | 3000 | — | — | — | ... | — | — | — |
| 2 | ATA | 0 | 5000 | — | — | — | ... | — | — | — |

Fig.7

VOLUME MANAGEMENT TABLE TB

| LUN | FIRST MEMORY AREA MEDIUM TYPE | STARTING ADDRESS | ENDING ADDRESS | METADATA STORAGE | SECOND MEMORY AREA MEDIUM TYPE | STARTING ADDRESS | ENDING ADDRESS | METADATA STORAGE | ... | N-TH MEMORY AREA MEDIUM TYPE | STARTING ADDRESS | ENDING ADDRESS | METADATA STORAGE |
|---|---|---|---|---|---|---|---|---|---|---|---|---|---|
| 0 | FC | 0 | 999 | ○ | ATA | 1000 | 1999 | × | ... | — | — | — | — |
| 1 | FC | 0 | 3000 | ○ | — | — | — | — | ... | — | — | — | — |
| 2 | ATA | 0 | 5000 | ○ | — | — | — | — | ... | — | — | — | — |

FIRST EMBODIMENT

COMPARATIVE EXAMPLE

FILESYSTEM BUILDING METHOD

CROSS REFERENCE

The present application is based on, and claims priority from, Japanese Application No. 2005-265093 filed Sep. 13, 2005, the disclosure of which is herein incorporated by reference.

BACKGROUND

The present invention relates to storage system technology.

Storage systems of a type connected directly to a network, termed NAS (Network Attached Storage) are in widespread use. The use of such a storage system allows a filesystem to be shared among clients via the network, and enables the same file to be accessed by clients.

In recent years, there have been attempts to realize effective data utilization and efficient storage investment by storing data on storage media of optimal cost, depending on value of the data based on its importance or other consideration. This approach is termed information lifecycle management (ILM). For example, data of relatively high value is stored on an expensive FC (Fibre Channel) compatible hard disk, while data of relatively low value is stored on an inexpensive ATA compatible hard disk. Note that, FC compatible hard disks are characterized by higher reliability and faster access time than ATA compatible hard disks.

Where ILM is implemented using a plurality of types of storage media, such as an FC compatible hard disk and an ATA compatible hard disk, typical practice is to establish a logical unit for each type of storage medium, and to build a filesystem for each logical unit. That is, when implementing ILM, a plurality of filesystems are built for each type of storage medium.

Employing existing technology, it is also possible to establish one logical unit for the plurality of types of storage media, and to build one filesystem on the logical unit. However, in this case, it becomes difficult to deploy ILM appropriately, that is, to utilize the plurality of types of storage media in an efficient manner.

SUMMARY

The present invention solves the above-described problem of conventional technology, and there is need to provide a technique whereby a plurality of types of storage media can be utilized in an efficient manner, even in a case where one filesystem is built on the plurality of types of storage media.

At least part of the above and the other related objects is attained by an apparatus of the present invention. The apparatus is a management apparatus for managing a first type of storage medium and a second type of storage medium. The management apparatus comprises: a file manager for managing files within an integrated memory area that includes a first memory area composed of at least a part of the first type of storage medium and a second memory area composed of at least a part of the second type of storage medium. The file manager builds one filesystem on the integrated memory area, in consideration of a range of the first memory area and a range of the second memory area.

Where a filesystem is built on an integrated memory area without consideration to the range of the first memory area and the range of the second memory area, there is a possibility that a file is stored spanning the first memory area and the second memory area. However, with this apparatus, a filesystem is built on the integrated memory area with consideration to the range of the first memory area and the range of the second memory area. Thus, a file will not be stored spanning the first memory area and the second memory area, and files are stored in file units in the first memory area or the second memory area within one filesystem. As a result, it is possible for the first type of storage medium and the second type of storage medium to be utilized effectively.

In the above apparatus, it is preferable that the file manager establishes a plurality of group areas within the integrated memory area. It is preferable that each of the plurality of group areas does not span the first memory area and the second memory area.

In this way, by establishing group areas that do not span the first memory area and the second memory area in advance, a file will not be stored spanning the first memory area and the second memory area.

In the above apparatus, the file manager may establish a first type of group area in the first memory area, wherein in the first type of group area metadata is stored. And the file manager may establish a second type of group area in the second memory area, wherein in the second type of group area metadata is not stored.

When accessing a file, the metadata is retrieved. By employing above arrangement, when retrieving the metadata, it suffices to search the first memory area only, as a result of which it is possible to quickly access the intended file.

This advantage is particularly notable in instances where the first type of storage medium can be accessed faster than the second type of storage medium.

Alternatively, in the above apparatus, the file manager may establish a group area in each of the first memory area and the second memory area, wherein in the group area metadata is stored.

In this arrangement, the per-bit cost entailed in storage of metadata can be reduced, as compared to the case where the first type of storage medium is more expensive than the second type of storage medium, and metadata is stored in first memory area only.

Alternatively, in the above apparatus, the file manager may establish within the integrated memory area a group area that spans the first memory area and the second memory area. And the file manager may build the filesystem such that actual data of a file is stored in the first memory area or the second memory area, based on area information indicating the range of the first memory area and the range of the second memory area.

In this arrangement, even where a group area is established spanning the first memory area and the second memory area, a file will not be stored spanning the first memory area and the second memory area.

In the above apparatus, it is preferable that the file manager further builds the filesystem such that metadata is stored in the first memory area and is not stored in the second memory area, based on the area information.

By employing above arrangement, when retrieving the metadata, it suffices to search the first memory area only, as a result of which it is possible to quickly access the intended file.

The present invention is also directed to a storage system including: the first type of storage medium; the second type of storage medium; and the above management apparatus.

It should be noted that the present invention may be actualized by a diversity of applications such as a management apparatus for managing different types of storage media, a storage system including the management apparatus, a network system including the storage system, a method for managing different types of storage media in these devices, computer programs that attain these methods or functions of these devices, recording media in which such computer programs are recorded, and data signals that include such computer programs and are embodied in carrier waves.

These and other objects, features, aspects, and advantages of the present invention will become more apparent from the following detailed description of the preferred embodiments with the accompanying drawings.

BRIEF DESCRIPTION OF THE DRAWINGS

FIG. 3 shows contents of a volume management table TB prepared in advance;

FIG. 7 shows content of a volume management table TB obtained when the process of FIG. 5 is completed;

DESCRIPTION OF THE PREFERRED EMBODIMENT

Embodiments of the present invention are discussed below based on examples in the following order.
A. First Embodiment:
  A-1. Configuration of Network System:
    A-1-1. Internal Configuration of Storage System:
    A-1-2. Internal Configuration of Management Server:
  A-2. Creation of Filesystem:
  A-3. Structure of Filesystem on Integrated Memory Area:
  A-4. Creation of New File:
  A-5. Transferring File:
B. Second Embodiment:
C. Third Embodiment:

A. First Embodiment

Figure 1:
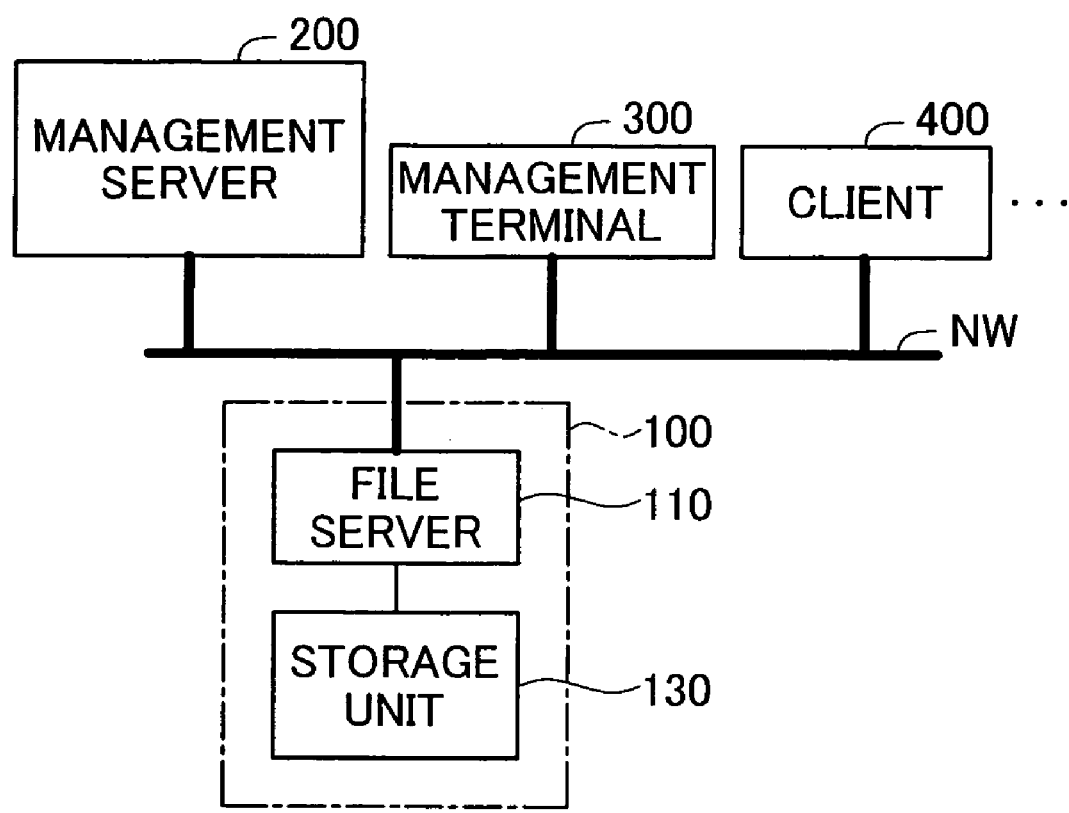
FIG. 1 shows a simplified configuration of a network system.

A-1. Configuration of Network System:

FIG. 1 shows a simplified configuration of a network system. The network system comprises a storage system (NAS) 100, a management server 200, a management terminal 300, and a plurality of clients 400. Each device is connected to an IP based network NW, with communication among devices taking place according to TCP/IP.

The storage system 100 comprises a file server (also referred to as an NAS head) 110, and a storage unit 130. In this embodiment, the file server 110 and the storage unit 130 are housed in different cases, but could instead be housed in a common case.

Figure 2:
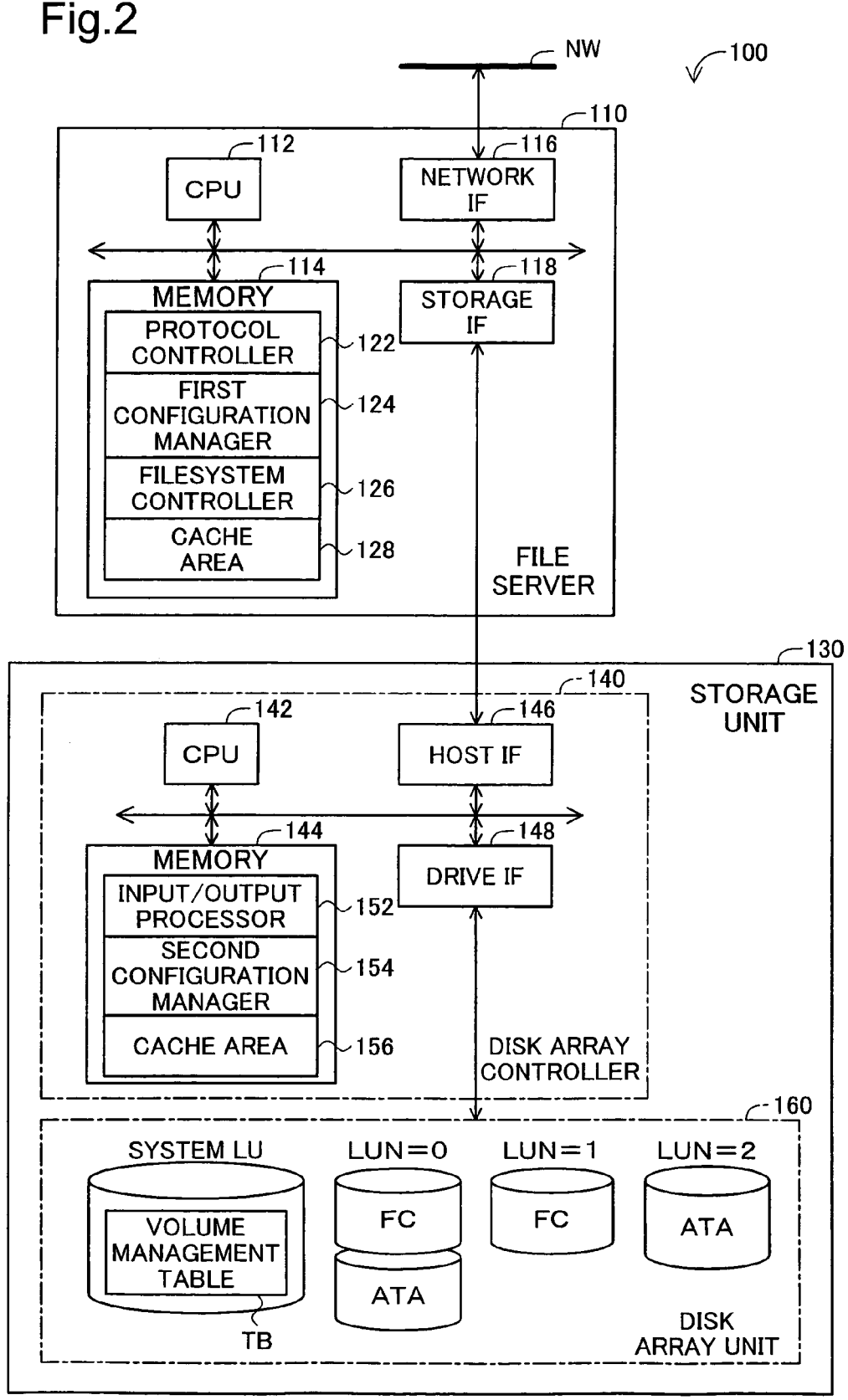
FIG. 2 shows internal configuration of a storage system 100.

A-1-1. Internal Configuration of Storage System:

FIG. 2 shows the internal configuration of the storage system 100. As noted, the storage system 100 comprises the file server 110 and the storage unit 130. The storage unit 130 comprises a disk array controller 140 and a disk array unit 160. Note that, the file server 11 and the disk array controller 140 may be the same device (e.g. the same processor).

The file server 110 comprises a CPU 112, a memory 114 such as ROM and RAM, a network interface (IF) 116, and a storage interface (IF) 118. The network interface 116 is an interface for communicating with external devices through the network NW, and the storage interface 118 is an interface for communicating with the storage unit 130.

In the memory 114 are stored a computer program that functions as a protocol controller 122, a computer program that functions as a first configuration manager 124, and a computer program that functions as a filesystem controller 126. Also in the memory 114, a cache area 128 for temporary storage of data in transfer is provided.

The protocol controller 122 is a program executed by the CPU 112, for executing various processes in accordance with protocol, in order to carry out communication with external devices via the network NW.

The first configuration manager 124 is a program executed by the CPU 112, for creating a filesystem on one or more logical units established in the disk array unit 160, and managing associations between logical units and filesystems.

The filesystem controller 126 is a program executed by the CPU 112, for controlling various processes such creating or moving files. For example, the filesystem controller 126 modifies the content of the filesystem in conjunction with creation or movement of a file.

The disk array controller 140 comprises a CPU 142, a memory 144 such as ROM and RAM, a host interface (IF) 146, and a drive interface (IF) 148. The host interface 146 is an interface for communicating with the file server 110 that functions as the host of the storage unit 130, and the drive interface 148 is an interface for driving the disk array unit 160 to input/output data.

In the memory 144 are stored a computer program that functions as a input/output processor 152, and a computer program that functions as a second configuration manager 154. Also in the memory 144, a cache area 156 for temporary storage of data in transfer is provided.

The input/output processor 152 processes I/O commands given from the file server 110 via the host IF 146. For example, in accordance with a read command or a write command, the input/output processor 152 executes a data read or write process on the disk array unit 160.

The second configuration manager 154 is a program executed by the CPU 142, for establishing logical units for the disk array unit 160, and managing associations between logical units and actual disks (storage media). The second configuration manager 154 also creates in the disk array unit 160 a volume management table TB (described later) indicating the aforementioned associations.

The disk array unit 160 comprises a disk array composed of a plurality of storage media (e.g. a plurality of hard disk drives). The disk array may also be of RAID configuration. In this embodiment, two types of hard disk are used, namely, expensive FC compatible hard disks and inexpensive ATA compatible hard disks. Hereinafter, FC compatible hard disks are also referred to as "first type media," and ATA compatible hard disks are also referred to as "second type media."

Typically, the disk array unit 160 is partitioned into logical units (LU) for use. In FIG. 2, one system LU and three data LUs have been prepared. The first data LU is an integrated memory area (integrated LU) that includes a memory area composed of part of a first type medium (FC) and a memory area composed of part of a second type medium (ATA); it is assigned a logical unit number (LUN) of "0." The second LU is a memory area composed of part of a first type medium (FC) and is assigned a LUN of "1." The third LU is a memory area composed of part of a second type medium (ATA), and is assigned a LUN of "2." In this embodiment, the system LU is a memory area composed of part of a first type medium (FC). As illustrated, a volume management table TB is stored in the system LU. Note that, each memory area may be composed of all or part of a single disk of the corresponding type, or composed of multiple disks of the corresponding type.

The volume management table TB is created in advance by the network system administrator, from the management terminal 300. Specifically, in accordance with instructions by the administrator, the second configuration manager 154 of the storage unit 130 creates the volume management table TB.

FIG. 3 shows the contents of the volume management table TB prepared in advance. This volume management table TB is created prior to creation of a filesystem on each data LU. As illustrated, information for each data LU is contained in the volume management table TB. Specifically, in the volume management table TB, for each type of medium making up a memory area, the type of medium making up the memory area, and the starting address and ending address of the memory area are established.

For example, as described with reference to FIG. 2, the first LU (LUN=0) includes a memory area composed of a first type medium (FC) and a memory area composed of a second type medium (ATA). Thus, in the volume management table TB, with regard to the first LU, "FC" is registered as the type of medium of the first memory area, and a starting address of "0" and an ending address of "999" of the first memory area are registered. "ATA" is registered as the type of medium of the second memory area, and a starting address of "1000" and an ending address of "1999" of the second memory area are registered.

Similarly, the second LU (LU=1) includes a memory area composed of a first type medium (FC) only. Thus, in the volume management table TB, with regard to the second LU, "FC" is registered as the type of medium of the first memory area, and a starting address of "0" and an ending address of "3000" of the first memory area are registered. The third LU (LU=2) includes a memory area composed of a second type medium (ATA) only. Thus, in the volume management table TB, with regard to the third LU, "ATA" is registered as the type of medium of the first memory area, and a starting address of "0" and an ending address of "5000" of the first memory area are registered.

Note that, the file server 110 of this embodiment corresponds to a management apparatus in the present invention, and the first configuration manager 124 and the filesystem controller 126 correspond to a file manager in the present invention.

Figure 4:
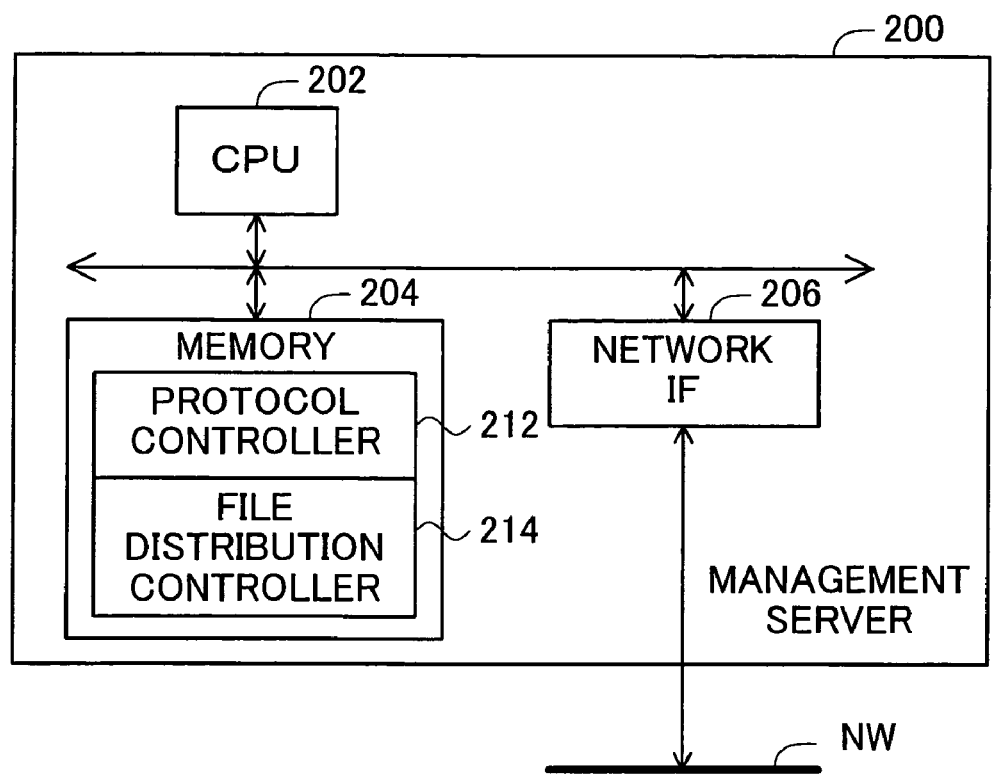
FIG. 4 shows internal configuration of a management server 200.

A-1-2. Internal Configuration of Management Server:

FIG. 4 shows the internal configuration of the management server 200. The management server 200 comprises a CPU 202, a memory 204 such as ROM and RAM, and a network interface (IF) 206. The network interface 206 is an interface for communicating with external devices via the network NW.

In the memory 204 are stored a computer program that functions as a protocol controller 212, and a computer program that functions as a file distribution controller 214.

The protocol controller 212, like the protocol controller 122 of FIG. 2, is a program executed by the CPU 202, for executing various processes in accordance with protocols, in order to carry out communication with external devices via the network NW.

The file distribution controller 214 is a program executed by the CPU 202, for determining which type of medium should be used for storing a file that is to be stored in the integrated memory area (integrated LU) in the storage system 100. Specifically, in the event of a query from the file server 110, the file distribution controller 214 decides on a storage destination medium for a file in the integrated LU, in accordance with a distribution rule established previously by the administrator. Distribution rules can be established utilizing various information (attributes) belonging to files, such as, file name, last update time of file, file size, file creator, or the like. Distribution rules can also prescribe a storage destination medium type depending on the value of a file. Note that, distribution rule information is stored in the memory of the management server 200.

For example, if a file name includes a predetermined text string, if last update time of file is after a predetermined time, if file size exceeds a predetermined size, if the name of the file creator matches a name registered in a list, or the like, the file distribution controller 214 will deem the file to have high value, and will select a medium of the first type (FC) as the file storage destination.

Distribution rules can utilize not only various information (attributes) belonging to files, but also other information that does not belong to files. For example, the period of time for which a file is stored in the storage system 100 could be utilized. In this case, it would be acceptable, for example, to select a medium of the first type (FC), which requires a relatively short time for write operations, as the file storage destination during time periods when large numbers of files are saved (e.g. during business hours on weekdays), while selecting a medium of the second type (ATA), which requires a relatively long time for write operations, as the file storage destination during time periods when few files are saved (e.g. times other than business hours on weekdays).

Figure 5:
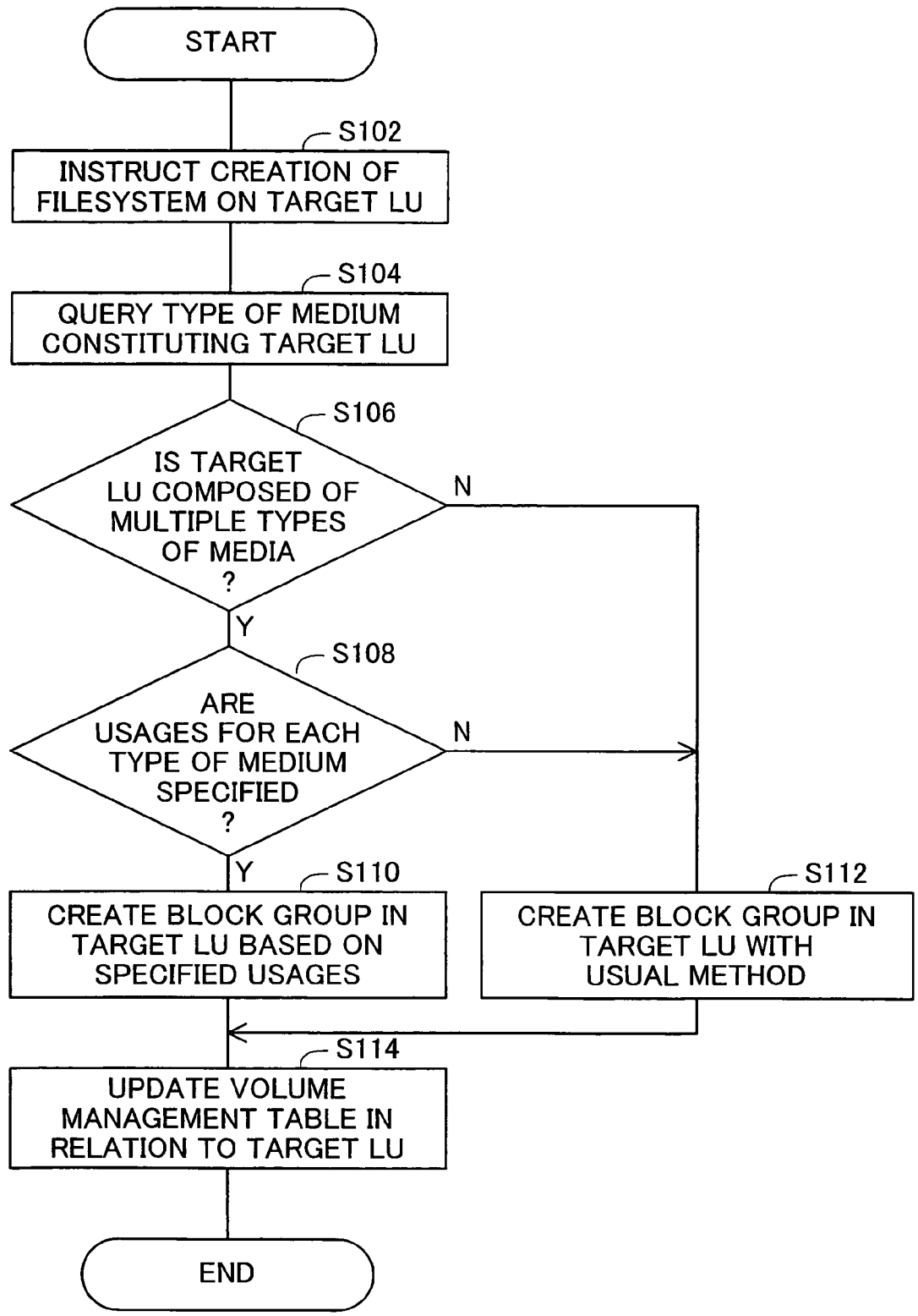
FIG. 5 is a flowchart depicting the procedure for creating a filesystem.

A-2. Creation of Filesystem:

FIG. 5 is a flowchart depicting the procedure for creating a filesystem. In Step S102, the administrator, using the management terminal 300, instructs the file server 110 to create a filesystem on a target LU. During this process, via the management terminal 300, the administrator sends to the file server 110 information specifying whether or not metadata is permitted to be stored in a memory area. Where a fast and expensive FC and a slow and inexpensive ATA are to be integrated, the administrator may decide whether or not metadata is permitted to be stored based on the following consideration. Specifically, if it is desired to "store metadata to the FC exclusively, for faster access despite higher cost," metadata will be stored to the FC exclusively. On the other hand, if it is desired to "store metadata to both the FC and the ATA, to lower the cost despite lower performance," metadata will be stored to the FC and the ATA. On the basis of the decision, the administrator then creates information specifying whether or not metadata is permitted to be stored.

In Step S104, the first configuration manager 124 in the file server 110 that has received the instruction queries the second configuration manager 154 in the storage unit 130, regarding the type of medium constituting the target LU. At this time, the second configuration manager 154 refers to the volume management table TB, and notifies the first configuration manager 124 of the type of medium constituting the target LU.

In Step S106, the first configuration manager 124, on the basis of the notification by the second configuration manager 154, determines whether the target LU is composed of multiple types of media. If the target LU is composed of multiple types of media (e.g. where the target LU is the first LU (LUN=0)), the routine proceeds to Step S108. On the other hand, if the target LU is composed of a single type of medium rather than multiple types of media (e.g. where the target LU is the second LU (LUN=1) or the third LU (LUN=2)), the routine proceeds to Step S112.

In Step S108, the first configuration manager 124 decides whether usages (settings) for each type of medium have been specified from the management terminal 300. In this embodiment, usages to the effect that metadata is stored to the first type of medium, but is not stored to the second type of medium, are specified. Note that, metadata includes directory information, and an inode that contains a data pointer indicating the storage location of the actual data of a file. Metadata will be discussed further later.

Where a usage has been specified, the routine proceeds to Step S110. On the other hand, no usage has been specified, the routine proceeds to Step S112.

In Step S110, the first configuration manager 124 creates in the target LU (integrated LU) a block group on the basis of the specified usages. At this time, the first configuration manager refers to the volume management table TB (FIG. 3), and creates the block group in consideration of the address range of each memory area. By so doing, a filesystem is created within the target LU. Note that, the block group corresponds to a group area in the present invention.

Figure 6:
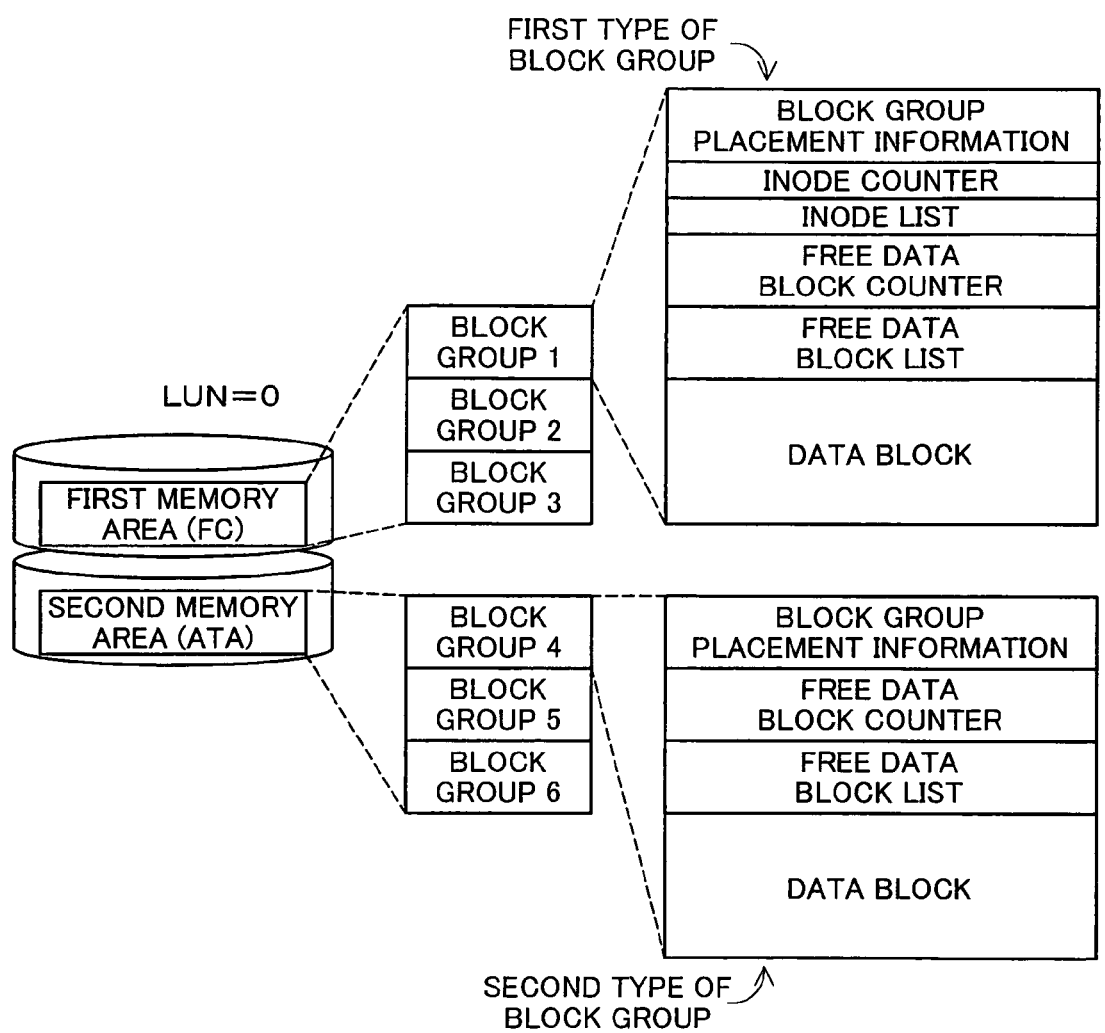
FIG. 6 shows structure of the filesystem created on the first LU (LUN=0) in Step S110 (FIG. 5)

FIG. 6 shows the structure of the filesystem created on the first LU (LUN=0) in Step S110 (FIG. 5).

Where a filesystem is created on an LU, typically, one or more block groups are created for the LU regardless of whether or not the LU is composed of multiple types of media. Thus, where an LU is composed of multiple types of media, there is a possibility that a block group is created spanning two or more types of media.

However, in this embodiment, block groups are created with consideration to the address range of each memory area, on a per-memory area basis, in other words, on a per-medium type basis. Thus, each block group is created within a single medium, without spanning two or more types of media.

Specifically, in this embodiment, as depicted in FIG. 6, three block groups are created in the first memory area composed of a first type medium (FC), and three block groups are created in the second memory area composed of a second type medium (ATA). Each block group is created without spanning the first type of medium and the second type of medium, in other words, without spanning the first memory area and the second memory area. Note that, block groups may be created for each of predetermined sizes (capacity), or created in predetermined number.

As depicted in FIG. 6, the arrangement of block groups created in the first memory area (hereinafter also termed "first type block groups") differs from the arrangement of block groups created in the second memory area (hereinafter also termed "second type block groups").

Specifically, the first type block groups have the typical arrangement, including block group placement information, an inode counter, an inode list, a free data block counter, a free data block list, and a data block. The second type block groups have an arrangement similar to that of the first type block groups, but do not include an inode counter and an inode list. While metadata is stored in the data block of first type block group, metadata is not stored in the data block of second type block group. Each of the aforementioned elements included in the block groups will be discussed later.

The arrangement of block groups created in the first memory area differs from the arrangement of block groups created in the second memory area in this way, due to different usages. Specifically, in this embodiment, in Step S108, there are specified usages to the effect that metadata is stored in the first type medium, but not in the second type medium. Thus, in this embodiment, in the first memory area composed of the first type medium, the first type of block group including an inode counter and an inode list and permitting metadata to be stored is created. In the second memory area composed of the second type medium, on the other hand, the second type of block group not including an inode counter and an inode list and not permitting metadata to be stored is created.

The description now returns to FIG. 5. In Step S112 (FIG. 5), the first configuration manager 124 creates block groups within the target LU, by the usual method, i.e. without any awareness of the type of medium. In this embodiment, one or more block groups are created in the second LU (LUN=1) and the third LU (LUN=2), respectively. Each block group is the first type of block group including an inode counter and an inode list and capable of storing metadata is created.

In Step S114, the first configuration manager 124 causes the second configuration manager 154 to update the volume management table TB.

FIG. 7 shows the content of the volume management table TB obtained when the process of FIG. 5 is completed. While FIG. 7 is similar to FIG. 3, whether or not metadata is permitted to be stored is added to the table, for each type of medium constituting a memory area.

In FIG. 7, memory areas set to allow storage of metadata are assigned the symbol "O", and memory areas set to disallow storage of metadata are assigned the symbol "X."

For example, the first LU (LUN=0) is composed of a first type of medium (FC) and a second type of medium (ATA). Thus, on the basis of the usages specified in Step S108, the first memory area composed of the first type of medium (FC) is set to allow storage of metadata, while the second memory area composed of the second type of medium (ATA) is set to disallow storage of metadata. Each of the second LU (LUN=1) and the third LU (LUN=2) is composed of the one type of medium. Accordingly, each of memory areas within the second LU and the third LU is set to allow storage of metadata.

Figure 8:
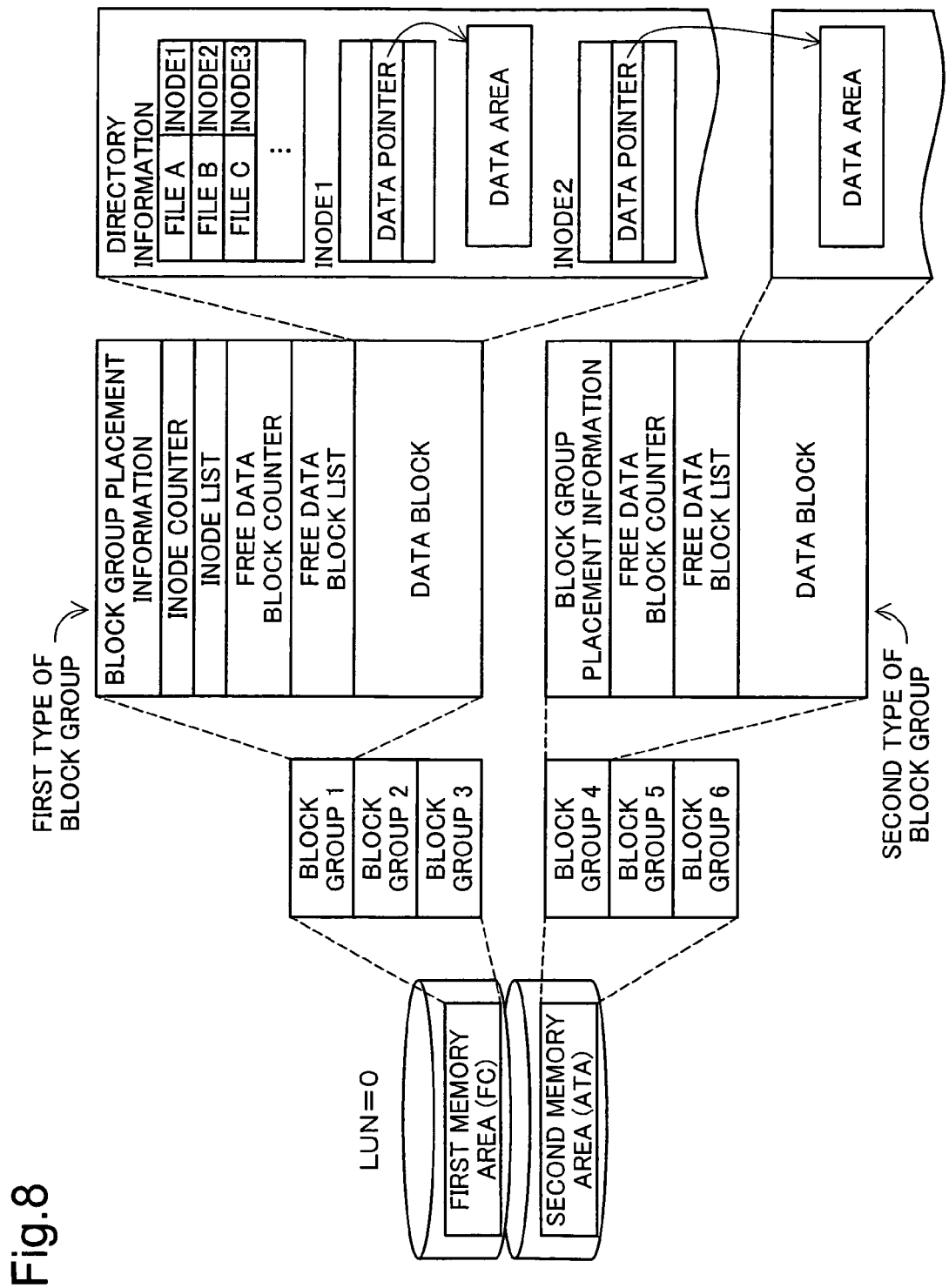
FIG. 8 shows structure of a filesystem on the first LU (LUN=0)

A-3. Structure of Filesystem on Integrated Memory Area:

FIG. 8 shows the structure of a filesystem on the first LU (LUN=0). While FIG. 8 is similar to FIG. 6, in FIG. 8, an illustration of data inside data blocks has been added. In FIG. 8, files have already been stored.

As discussed previously, each of the first and second types of block group contains block group placement information, a free data block counter, a free data block list, and a data block. The first type of block group further includes an inode counter and an inode list.

Both the first and second types of block group contain a data block, but the data block in the first type of block group and the data block in the second type of block group contain different information. Specifically, the data block in the first type of block group includes metadata composed of directory information and inodes, and a data area in which the actual data of file is stored, whereas the data block in the second type of block group includes a data area only.

Directory information is information that registers associations between file names and inode numbers. Note that, in FIG. 8, one directory has been created, but several directories may be created.

Each inode includes information of various kinds such as file size, last update time, and data pointer. The data pointer indicates the location (address) of the data area where the actual data of file is stored.

For example, in FIG. 8, in "block group 1" in the first memory area, "file A" is associated with "inode1", and the data pointer of "inode1" identifies the location of the data area in which the data making up "file A" (termed "actual data") is stored. Similarly, in "block group 1", "file B" is associated with "inode2", and the data pointer of "inode2" identifies the location of the data area in which the actual data of "file B" is stored. In FIG. 8, the actual data of "file A" is stored in "block group 1" in the first memory area, and the actual data of "file B" is stored in "block group 4" in the second memory area.

In this way, in this embodiment metadata composed of directory information and inodes is only stored in the first memory area, while the actual data of file is stored in either of two memory areas, depending on the value of the data.

The block group placement information is information indicating the range (address) of the block group to which it pertains.

The free data block counter is a counter for assigning numbers sequentially to areas when storing inodes and actual data of files in free areas within a data block. The free data block list contains information indicating ranges (addresses) of free areas in a data block.

The inode counter is a counter for assigning numbers sequentially to inodes. The inode list contains information indicating locations (addresses) of inodes in a data block.

In FIG. 8, since the file is already stored, metadata is stored in the data block of the first type of block group, but at the time immediately after the process of FIG. 5, the metadata is not stored. In the process of FIG. 5, only a root directory is created in the data block within the first type of block group.

When creating block groups in FIG. 5, initialization of the block groups is carried out at the same time. For example, the address range of the block group is registered in its block group placement information, and the values of the inode counter and the free data block counter are set to their initial values.

Figure 9:
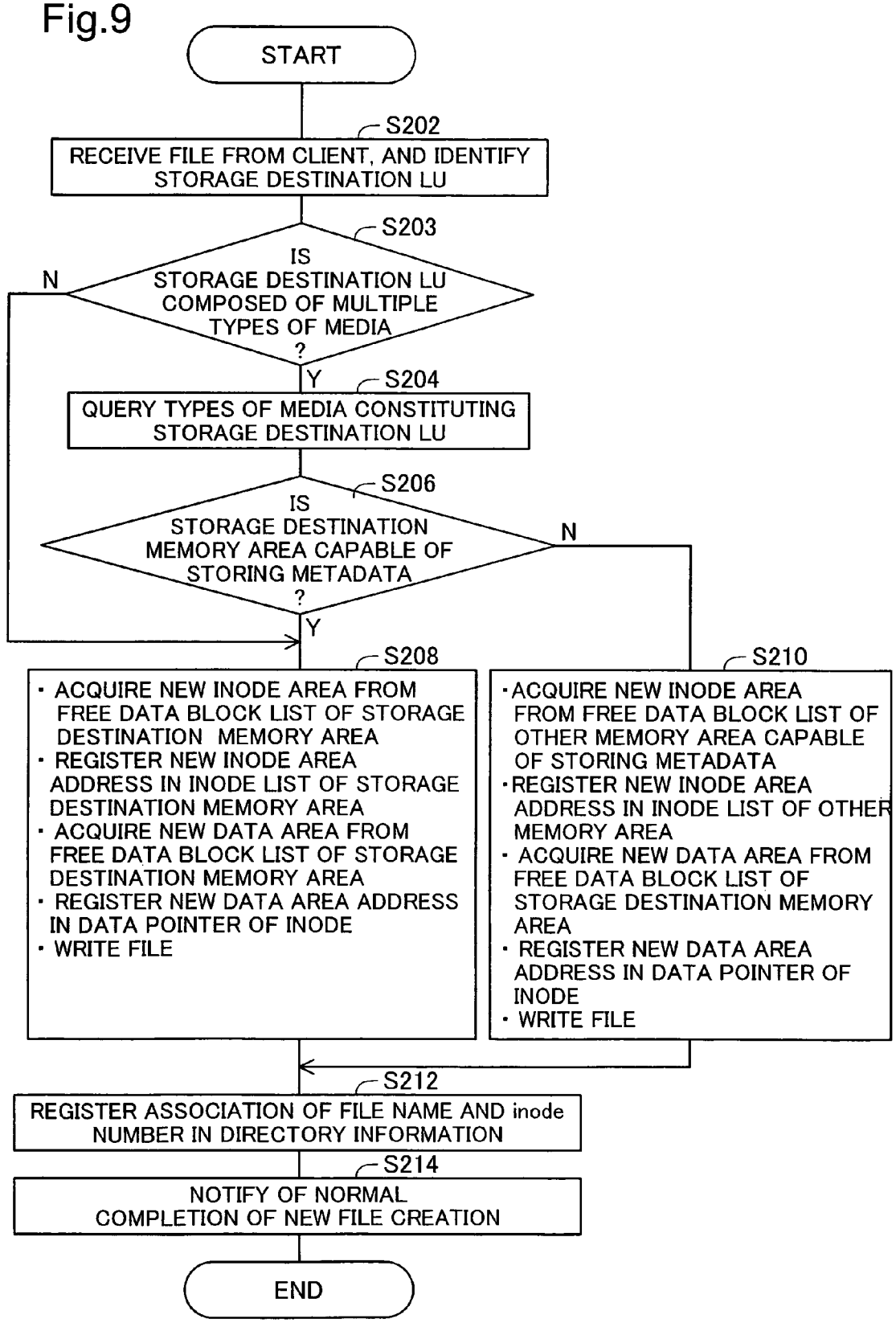
FIG. 9 is a flowchart depicting the procedure when creating a new file within an LU.

A-4. Creation of New File:

FIG. 9 is a flowchart depicting the procedure when creating a new file within an LU.

In Step S202, the file server 110 receives a target file for storage from a client 400. Specifically, the user of the client 400, while confirming the screen display on the computer (client 400), instructs that a target file be stored to a target disk connected to the network. At this time, the client 400 sends to the file server 110 disk information indicating the target disk, and the target file. On the basis of the received disk information, the filesystem controller 126 in the file server 110 then identifies the LU where the received file is to be stored (storage destination LU).

In Step S203, the filesystem controller 126 refers to the volume management table TB and decides whether the storage destination LU is composed of multiple types of media. If the storage destination LU is composed of multiple types of media (e.g. the storage destination LU is the first LU (LUN=0)), the routine proceeds to Step S204. If the storage destination LU is not composed of multiple types of media (e.g. the storage destination LU is the second LU (LUN=1) or the third LU (LUN=2)), the routine proceeds to Step S208.

In Step S204, the filesystem controller 126 queries the management server 200 regarding the type of medium where the file is to be stored (storage destination medium). During this process, the filesystem controller 126 sends to the management server 200 information regarding the target file as well. At this time, the file distribution controller 210 in the management server 200, on the basis of information such as file name or last update time of the received target file, determines the type of storage destination medium in accordance with a distribution rule, and notifies the filesystem controller 126.

In Step S206, the filesystem controller 126 decides whether it is possible to store metadata in the storage destination memory area corresponding to the storage destination medium specified in Step S204. This decision is made be referring to the volume management table TB (FIG. 7). If it is possible to store metadata in the storage destination memory area (e.g. where the storage destination memory area is the first memory area composed of the first type of medium (FC)), the routine proceeds to Step S208. On the other hand, if it is not possible to store metadata in the storage destination memory area (e.g. where the storage destination memory area is the second memory area composed of the second type of medium (ATA)), the routine proceeds to Step S210.

In Step S208, the filesystem controller 126 creates an inode, and writes the actual data of the file to the storage destination memory area (e.g. the first memory area of FIG. 8). Note that, the address range of the storage destination memory area is identified by referring to the volume management table TB.

Specifically, first, one block group (e.g. "block group 1" in FIG. 8) is selected as the target block group, from among one or more block groups created in the storage destination memory area. Where two or more block groups are present, the target block group is selected sequentially in cyclical fashion from among the two or more blocks by the filesystem controller 126.

Next, a new inode area is acquired from the free data block list in the target block group of the storage destination memory area, and the address of the new inode area is registered in the inode list. When acquiring the new inode area, a new inode number is determined by the inode counter, and the value of the inode counter is incremented by 1. Also, when acquiring the new inode area, the value of the free data block counter is incremented by 1.

Next, a new data area is acquired from the free data block list in the target block group of the storage destination memory area, and the address of the new data area is registered in the data pointer of the inode. When acquiring the new data area, the value of the free data block counter is incremented by 1. The actual data of the file is then written to the new data area.

For example, in Step S208, if "file A" is stored to the first memory area composed of the first type of medium (FC) of the first LU (LUN=0), as shown in FIG. 8, "inode1" is created in the first memory area, and the actual data of "file A" is stored in the first memory area. In FIG. 8, during saving of "file A", "block group 1" is selected as the target block group.

On the other hand, in Step S210, the filesystem controller 126 creates an inode in another memory area capable of storing metadata (e.g. the first memory area in FIG. 8) different from the storage destination memory area (e.g. the second memory area of FIG. 8), and writes the actual data of the file to the storage destination memory area. Note that, the address range of the storage destination memory area and the address range of this other memory area are identified by referring to the volume management table TB.

Specifically, first, one block group (.e.g. "block group 1") is selected as a first target block group, from among one or more block groups created in the other memory area (e.g. the first memory area in FIG. 8). Also, one block group (e.g. "block group 4") created in the storage destination memory area (e.g. the second memory area in FIG. 8) is selected as a second target block group.

Then, in the first target block group of the other memory area, a new inode area is acquired from the free data block list, and the address of the new inode area is registered in the inode list.

Next, in the second target block group of the storage destination memory area, a new data area is acquired from the free data block list, and the address of the new data area is registered in the data pointer of the inode. The actual data of the file is then written to the new data area.

For example, in Step S210, if "file B" is stored to the second memory area composed of the second type of medium (ATA) of the first LU (LUN=0), as shown in FIG. 8, "inode2" is created in the second memory area, and the actual data of "file B" is stored in the second memory area. In FIG. 8, during saving of "file B", "block group 1" is selected as the first target block group, and "block group 4" is selected as the second target block group.

In Step S212, the filesystem controller 126 registers the association between file name and inode number in the directory information of the directory in which the target file is created.

For example, if in Step S208 "file A" is stored to the first memory area composed of the first type of medium (FC) of the first LU (LUN=0), as shown in FIG. 8, the association of "file A" and "inode1" is registered in the directory information in the first memory area. If in Step S210 "file B" is stored to the second memory area composed of the second type of medium (ATA) of the first LU (LUN=0), as shown in FIG. 8, the association of "file B" and "inode2" is registered in the directory information in the first memory area.

In Step S214, the filesystem controller 126 notifies the client 400 that new file creation has been completed normally. With this, the new file creation process is complete.

If the storage destination LU is composed of one type of medium (e.g. the storage destination LU is the second LU (LUN=1) or the third LU (LUN=2), the process of Step S208 will be executed. And then, an inode will be created and the actual data of the file will be written in the storage destination memory area.

Figure 10:
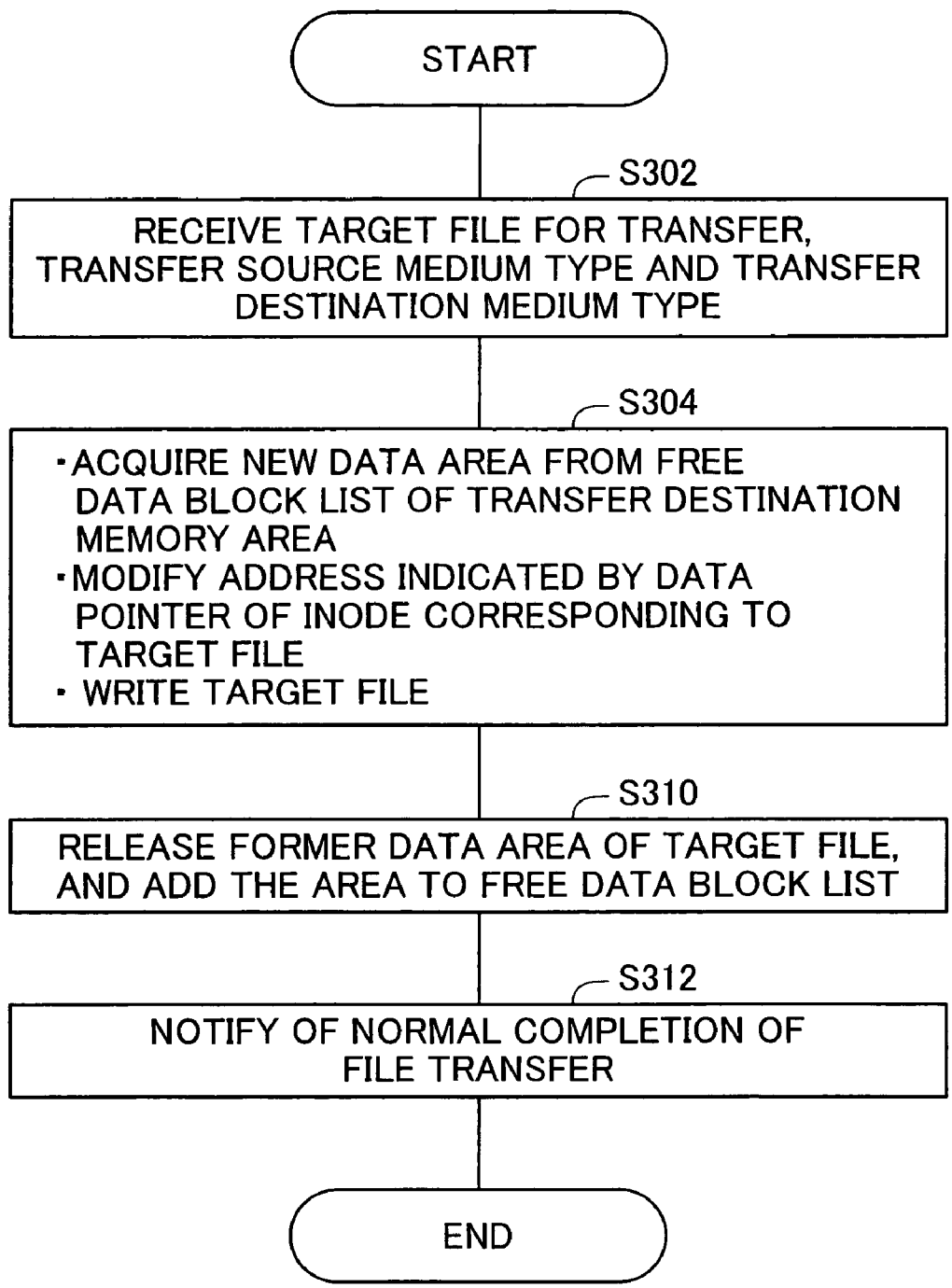
FIG. 10 is a flowchart depicting the procedure for transferring a file within an integrated LU.

A-5. Transferring File:

FIG. 10 is a flowchart depicting the procedure for transferring a file within the integrated LU. Transferring a file within the integrated LU is needed because the value of the file changes. For example, it is possible that even if a file had a high value when the file was stored, the file currently has a lower value. Conversely, it is also possible that even if a file had a low value when the file was stored, the file currently has a higher value. Also, in certain instances the distribution rule belonging to the file distribution controller 214 in the management server 200 may have changed between the time that the file was stored, and the current time.

In Step S302, the file server 110 receives from the management server 200 the target file to be transferred (moved), the type of the transfer source medium, and the type of the transfer destination medium. The type of transfer source medium is the type of the medium in which the target file to be transferred is stored, and the type of transfer destination medium is the type of the medium to which the target file is to be stored. Note that, the occasion for the management server 200 to send information such as target files for transfer (the occasion for the management server 200 to check the filesystem) may be an off-peak period, such as nights or non-working days.

Specifically, the file distribution controller 210 in the management server 200, while referring to the volume management table TB, checks the filesystem in the storage system 100, and inquires whether files in the integrated LU composed of multiple types of media have been stored according to the distribution rule. The file distribution controller 210 then determines any file that does not match the distribution rule to be a target file for transfer, and identifies the type of transfer source medium of the file. The file distribution controller 210 also determines the type of transfer destination medium, in accordance with the distribution rule.

For example, a file of low value stored in the first memory area composed of the first type of medium (FC) of the first LU (LUN=0) of FIG. 8 does not match the distribution rule, and is determined as a target file for transfer, and the first type of medium (FC) is identified as the transfer source medium. In accordance with the distribution rule, the second type of medium (ATA) is designated as the transfer destination medium.

In Step S304, the filesystem controller 126 writes to the transfer destination memory area the actual data of the file targeted for transfer, and modifies the contents of the inode corresponding to the file targeted for transfer. Note that, the address range of the transfer destination memory area is identified by referring to the volume management table TB.

Specifically, first, one block group is selected as the target block group, from among one or more block groups created in the transfer destination memory area.

Next, in the target block group of the transfer destination memory area, a new data area is acquired from the free data block list. Also, the address indicated by the data pointer of the inode corresponding to the target file is changed from the address of the former data area, to the address of the new data area. Where the transfer destination memory area is the first memory area of FIG. 8, the inode corresponding to the target file is included in the transfer destination memory area, whereas if the transfer destination memory area is the second memory area of FIG. 8, it is included in the transfer source memory area (i.e. the first memory area of FIG. 8).

Then, the actual data of the file for transfer is read out from the former data area in the transfer source memory area, and written to the new data area in the transfer destination memory area. Note that, the address of the former data area in which the actual data of the target file for transfer has been stored is identified by means of referring to the data pointer of the inode that corresponds to the file name and indicates address before transfer process.

In Step S310, the filesystem controller 126 frees up the former data area of the transfer source memory area, in which the actual data of the target file for transfer remains stored. Specifically, in the block group containing the former data area, the former data area is added as the free area to the free data block list. By so doing, it becomes possible to write other data to the former data area.

In Step S312, the filesystem controller 126 notifies the file distribution controller 210 in the management server 200 that file transfer has completed normally. With this, the file transfer process is complete.

Reception of the type of transfer source medium in Step S302 may be omitted. Also, where the integrated LU is composed of two types of media, it is possible to omit reception of the type of transfer destination medium. In this case, the filesystem controller 126 need only receive from the file distribution controller 210 within the management server 200 the information of the target file for transfer, and to transfer the target file for transfer to a medium of different type.

Figure 11:
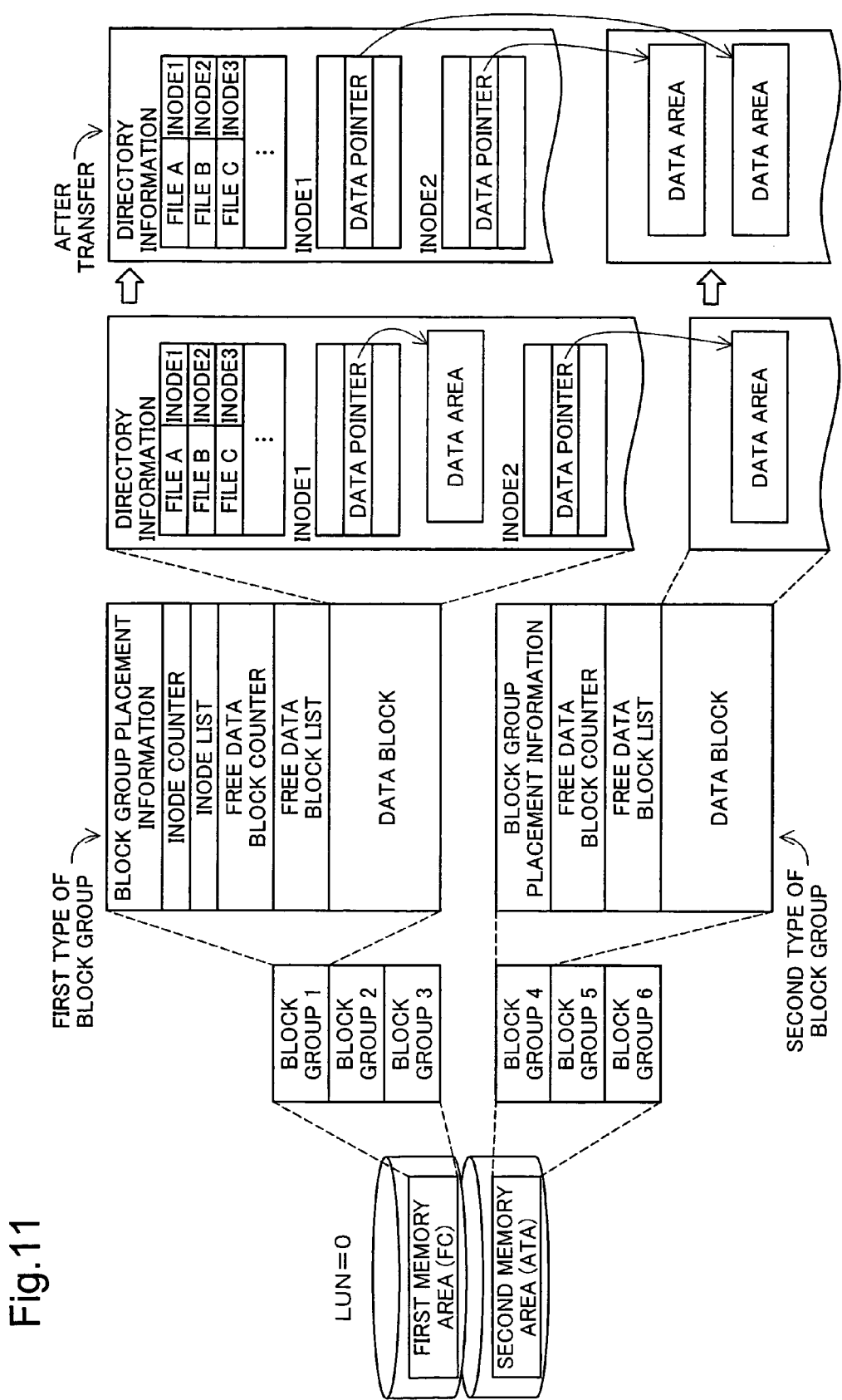
FIG. 11 shows structure of the filesystem before and after the file transfer process.

FIG. 11 shows the structure of the filesystem before and after the file transfer process. FIG. 11 is similar to FIG. 8, except that a diagram of the data block interior after the transfer process is added.

In FIG. 11, "file A" is being transferred from the first memory area composed of the first type of medium (FC) to the second memory area composed of the second type of medium (ATA). After the transfer process, a new data area storing the actual data of "file A" is established in the second memory area, and the former data area where the actual data of "file A" was stored previously is released from the first memory area. Also, the address indicated by the data pointer of "inode1" is modified from the address of the former data area to the address of the new data area. Note that, the directory information is not modified.

Similarly, where "file B" is transferred from the second memory area composed of the second type of medium (ATA) to the first memory area composed of the first type of medium (FC), after the transfer process, a new data area storing the actual data of "file B" is established in the first memory area, and the former data area where the actual data of "file B" was stored previously is released from the second memory area. Also, the address indicated by the data pointer of "inode2" is modified from the address of the former data area to the address of the new data area. Note that, the directory information is not modified.

In a preferred embodiment, the new data area for storing the actual data of "file B" may be established in "block group 1" where "inode 2" is stored. By so doing, since it is highly likely that "inode2" corresponding to "file B" and new data area storing the actual data of "file B" are situated in relatively close physical location, "file B" can be read out relatively fast. However, the new data area storing the actual data of "file B" may instead be established in another block group where "inode2" is not stored (e.g. in "block group 2" or "block group 3"). In this case, the address indicated by the data pointer of "inode2" may be modified to the address of the new data area established within the other block group.

As discussed above, in this embodiment, since metadata is only stored in the first memory area composed of the first type of medium (FC), when a file is transferred, the metadata relating to the file need only be modified, without being created anew.

As described hereinabove, in this embodiment, one filesystem is built on an integrated LU that includes a first memory area composed of part of the first type of medium (FC) and a second memory area composed of part of the second type of medium (ATA). Specifically, a plurality of block groups are established within the integrated LU, such that each block group does not span the first memory area and second memory area. That is, in this embodiment, block groups are established with consideration to the range of the first memory area and the range of the second memory area. Thus, during creation of a new file or file transfer (migration), the actual data of the file is not stored spanning the first memory area and the second memory area (in other words, spanning the first type of medium and the second type of medium), and within one filesystem files are distributed to the first memory area or second memory area, in file units. Accordingly, files can be stored to the appropriate type of medium depending on their value, and as a result it is possible to utilize a plurality of types of media efficiently.

Further, in this embodiment, since an integrated LU is established in two memory areas and one filesystem is built on the integrated LU, capacity management can be carried out more readily, compared with the case where two LUs are established in two memory areas, and two filesystems are built in the two memory areas. This is because where one filesystem is built, it is sufficient to check capacity targeting the one filesystem only, whereas if two filesystems are built, it is necessary to check capacity targeting both filesystems.

When accessing any file, the metadata is retrieved. In this embodiment, metadata is stored only in the first memory area. Thus, in this embodiment, when retrieving metadata, it is sufficient to search the first memory area only, and as a result it is possible to quickly access the intended file.

In particular, in this embodiment, metadata is stored only in the first memory area composed of the first type of medium (FC), which can be accessed faster than the second type of medium (ATA). Thus, in this embodiment, there is the advantage that the location of the actual data of a file can be identified quickly, as compared to the case where metadata is stored in both the first memory area composed of the first type of medium and the second memory area composed of the second type of medium.

By the way, where metadata is stored in only one of the memory areas, and individual filesystems are built on both memory areas, it is difficult to copy (remote copy) data to another LU, in filesystem units. With this embodiment, however, since one filesystem is built on an integrated LU, data can readily be copied in filesystem units, as discussed hereinafter.

Figure 12A:
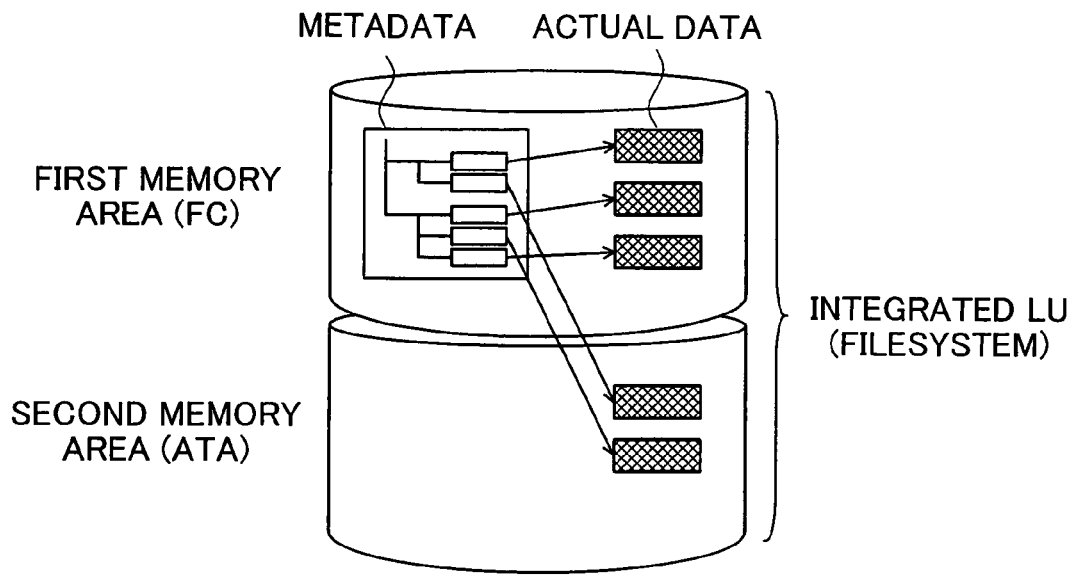
FIGS. 12(A) and 12(B) are illustrations depicting in model form the filesystem of the first embodiment and a filesystem of a comparative example, respectively.
Figure 12B:
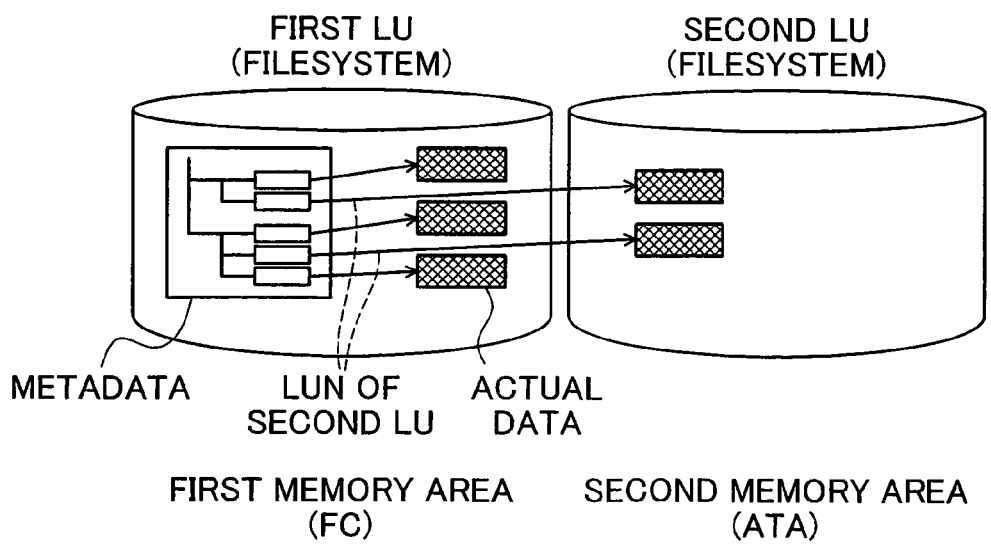

FIGS. 12(A) and 12(B) are illustrations depicting in model form the filesystem of the first embodiment and a filesystem of a comparative example, respectively.

In this embodiment, as depicted in FIG. 12(A), an integrated LU is established in the first memory area composed of the first type of medium (FC) and the second memory area composed of the second type of medium (ATA), with a one filesystem built on the integrated LU. Metadata is only stored in the first memory area.

In the comparative example, on the other hand, as depicted in FIG. 12(B), a first LU is established in the first memory area composed of the first type of medium (FC), and a second LU is established in the second memory area composed of the second type of medium (ATA). Two filesystems are built on the two LUs. Metadata is only stored in the first memory area.

Thus, in the comparative example, where the actual data of a file is stored in the second memory area (second LU), it is necessary for the data pointer of the inode in the metadata to include the LUN of the second LU.

Thus, where data is to be copied in filesystem units, assuming for example that only the data in the second LU is to be copied to another LU, it is necessary to modify the LUN contained in the data pointer of the inode. Thus, it is difficult to copy the data. A similar problem occurs where data in the first LU only is to be copied to another LU, or where data within the first and second LUs is to be copied to two other LUs.

In this embodiment, on the other hand, since the integrated LU is established in the two memory areas, even where the actual data of a file is stored in the second memory area, the data pointer of the inode in the metadata does not include a LUN. Thus, in this embodiment, data in the integrated LU can be copied easily to another LU. That is, in this embodiment, copying of data in filesystem units can be carried out more easily compared with the comparative example.

Also, in this embodiment, since an integrated LU is established in the two memory areas, and a one filesystem is built on the integrated LU, it is easier to implement a snapshot function for creating an image of the filesystem, as compared to the case where two LUs are established in the two memory areas, and two filesystems are built on the two LUs.

Figure 13:
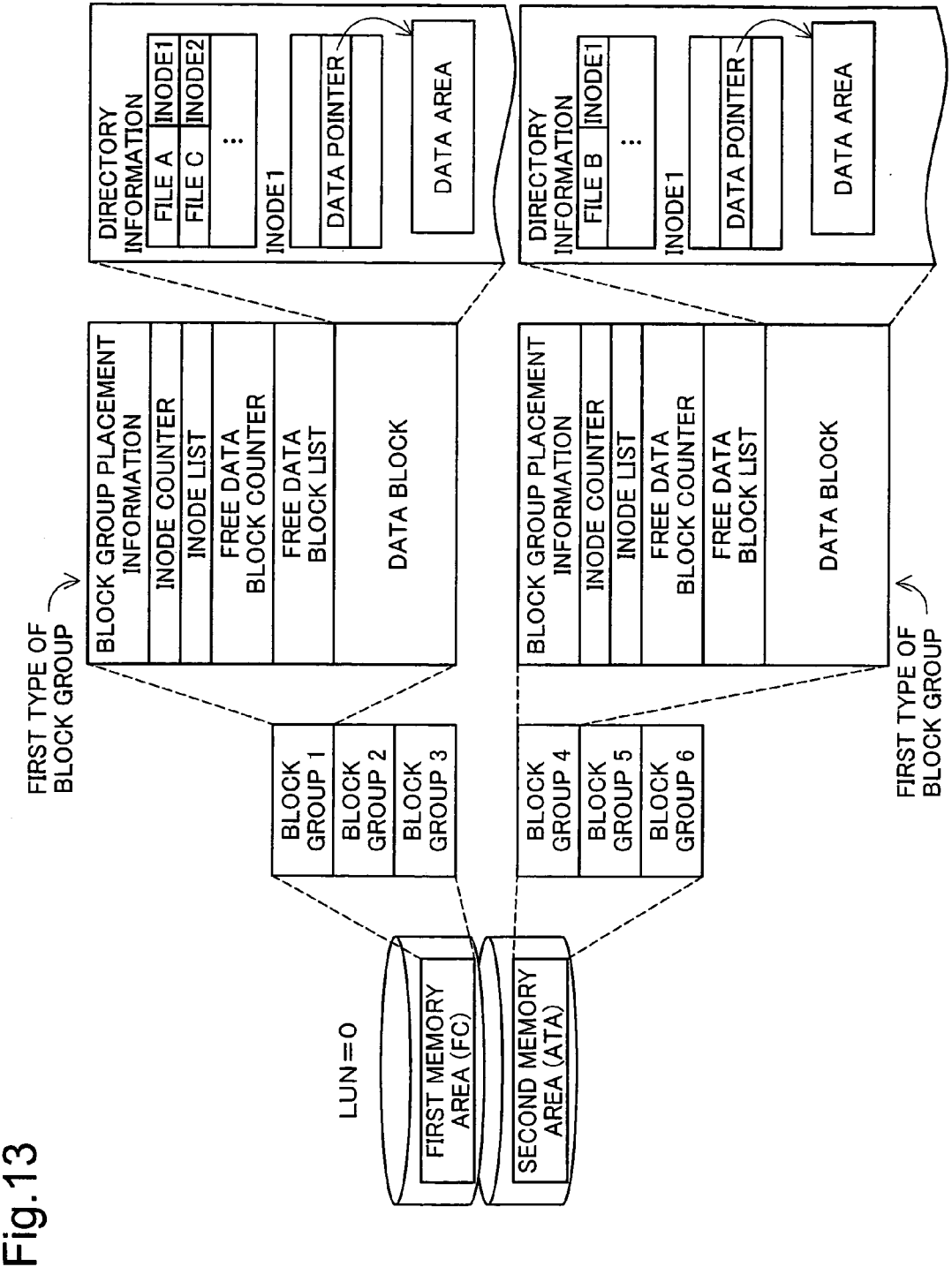
FIG. 13 shows structure of a filesystem on the first LU (LUN=0) in the second embodiment.

B. Second Embodiment:

FIG. 13 shows the structure of a filesystem on the first LU (LUN=0) in the second embodiment, and corresponds to FIG. 8. In FIG. 13, block groups created in the second memory area are modified, as compared with FIG. 8. Specifically, in the second memory area, similar to the block group established in the first memory area, there is created a block group of the first type including an inode counter and an inode list, and capable of storing metadata.

In this embodiment, as in the first embodiment, creation of the filesystem can be executed by the procedure depicted in FIG. 5. In this embodiment, however, usages to the effect that metadata is stored in both the first type of medium (FC) and the second type of medium (ATA), are specified. As a result, in this embodiment, the filesystem depicted in FIG. 13 is created within the first LU (LUN=0). Further, in this embodiment, the content of the volume management table TB obtained in Step S114 differs from that in the first embodiment (FIG. 7). Specifically, in regard to the first LU (LUN=0), both the first memory area composed of the first type of medium (FC) and the second memory area composed of the second type of medium (ATA) is set to allow storage of metadata.

In this embodiment, new file creation can be executed according to the procedure depicted in FIG. 9, as in the first embodiment. In this embodiment, however, the block groups created in the integrated LU are all block groups of the first type capable of storing metadata, and so the processes of Steps S203, S204, S206, and S210 may be omitted.

In FIG. 13, "file A" is stored in the same manner as in FIG. 8. On the other hand, while the actual data of "file B" is stored in "block group 4" in the second memory area, as in FIG. 8, the metadata (i.e. the directory information and inode) pertaining to "file B" is stored within "block group 4" in the second memory area, in contrast to FIG. 8.

Figure 14:
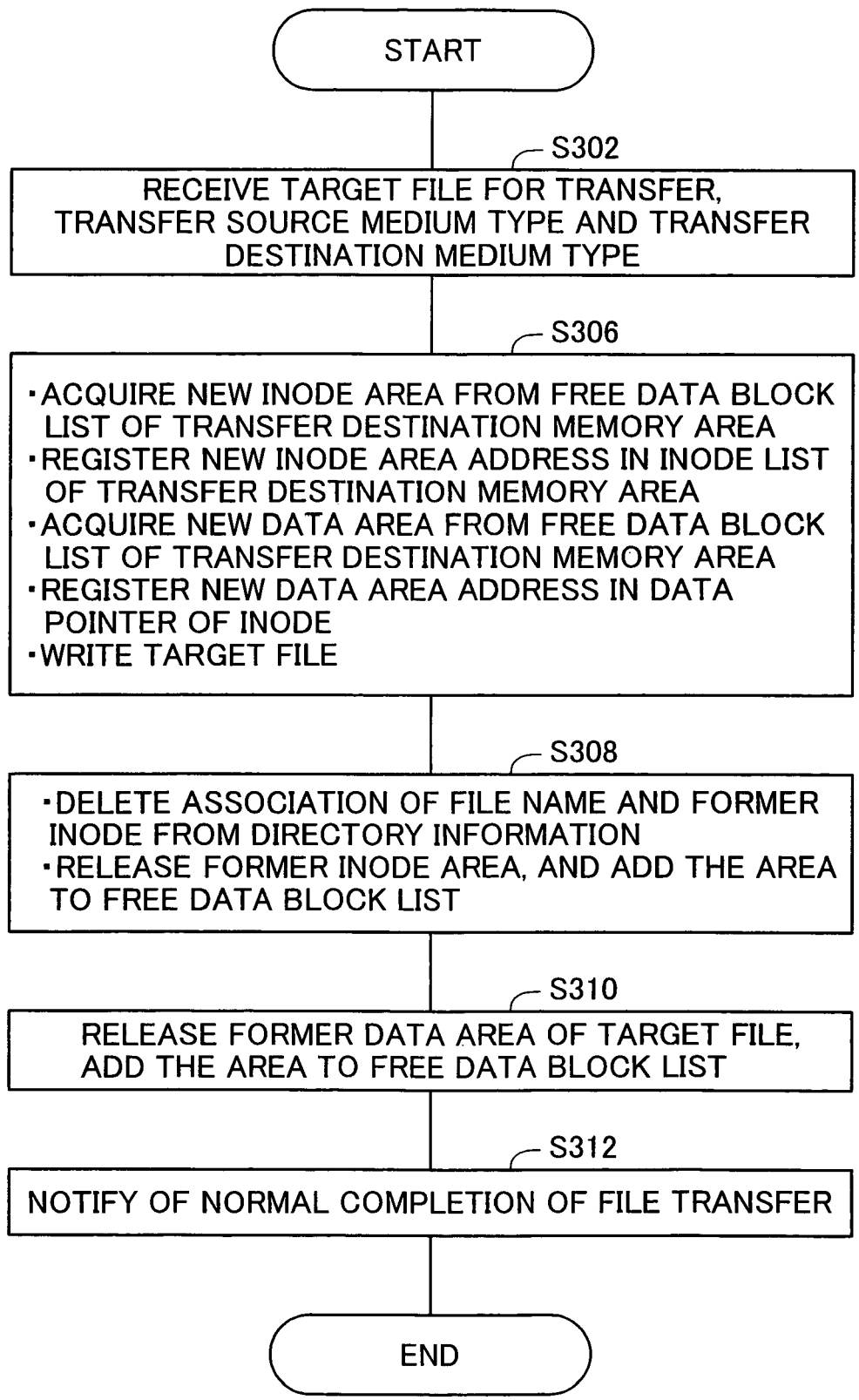
FIG. 14 is a flowchart depicting the procedure for transferring a file within an integrated LU in the second embodiment.

FIG. 14 is a flowchart depicting the procedure for transferring a file within the integrated LU in the second embodiment, and corresponds to FIG. 10. Note that, Steps S302, S310, and S312 of FIG. 14 are the same as in FIG. 10.

In Step S306, the filesystem controller 126 creates an inode and writes the actual data of the file targeted for transfer, in the transfer destination memory area. Note that, the process of Step S306 is similar to the process of Step S208 of FIG. 9.

Specifically, first, one block group is selected as a target block group, from among one or more block groups created in the transfer destination memory area.

Next, in the target block group of the transfer destination memory area, a new inode area is acquired from the free data block list, and the address of the new inode area is registered in the inode list.

Next, in the target block group of the transfer destination memory area, a new data area is acquired from the free data block list, and the address of the new data area is registered in the data pointer of the inode. Then, the actual data of the target file for transfer is read out from the former data area of the transfer source memory area, and written to the new data area of the transfer destination memory area.

In Step S308, the filesystem controller 126 deletes the association between the file name and the former inode, from the directory information in the transfer source memory area. Specifically, the aforementioned association is deleted from the directory information in the block group of the transfer source memory area, in which the target file for transfer remains stored.

In Step S308, the filesystem controller 126 frees up the former inode area of the transfer source memory area, in which the inode of the target file for transfer remains stored. Specifically, in the block group containing the former inode area, the former inode area is added as the free areas to the free data block list. By so doing, it becomes possible to write other data to the former inode area.

In Step S310, the former data area of the transfer source memory area in which the actual data of the target file for transfer remains stored is released, in the manner described with reference to FIG. 10.

Figure 15:
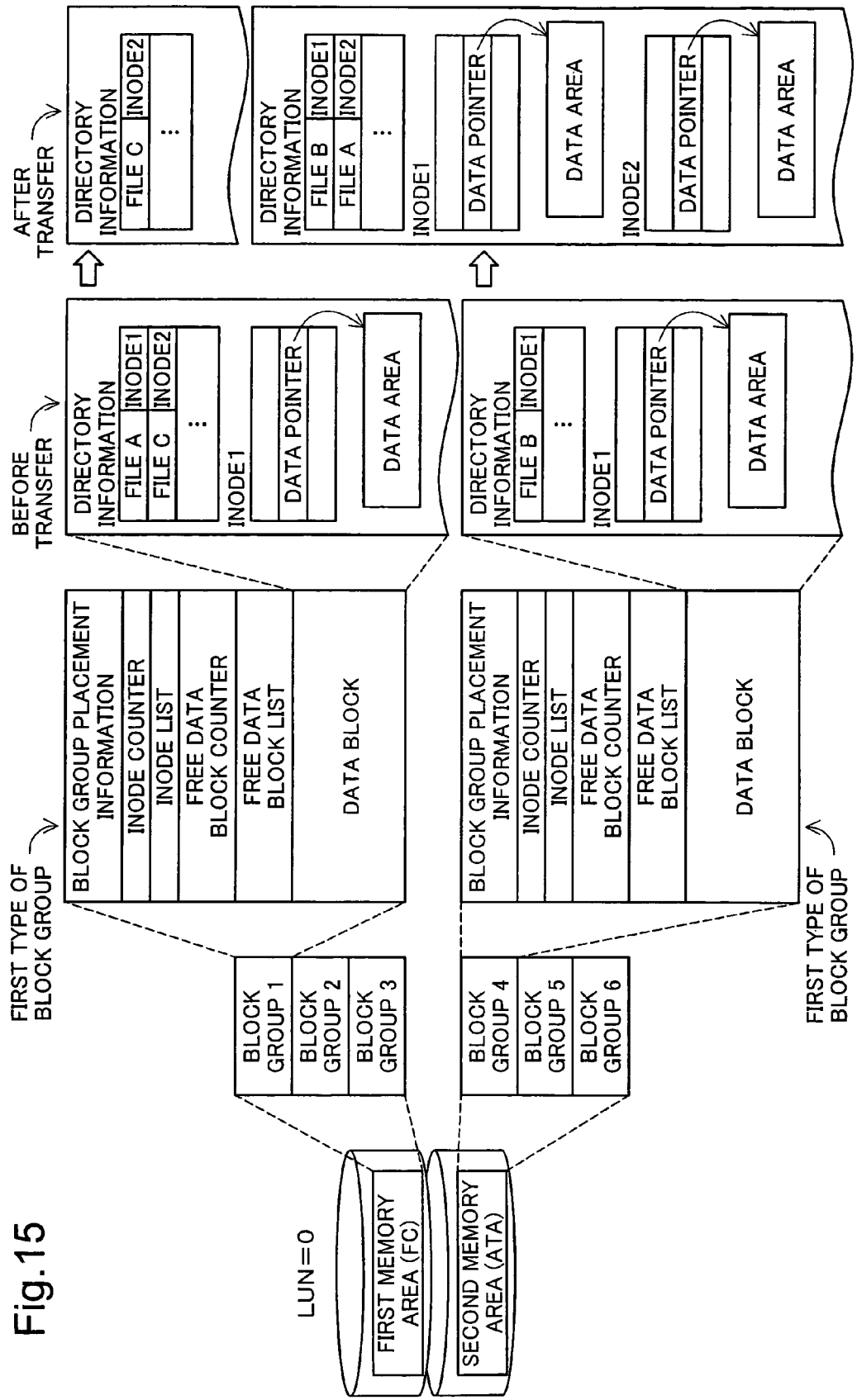
FIG. 15 shows structure of the filesystem before and after the file transfer process in the second embodiment.

FIG. 15 shows the structure of the filesystem before and after the file transfer process in the second embodiment. While FIG. 15 is similar to FIG. 13, a diagram of the data block interior after the transfer process is added.

In FIG. 15, "file A" is being transferred from the first memory area composed of the first type of medium (FC) to the second memory area composed of the second type of medium (ATA). After the transfer process, an association between "file A" and "inode2" is added to the directory information within the second memory area, and the association between "file A" and "inode1" is deleted from the directory information within the first memory area. Additionally, a new inode area of "file A" is established within the second memory area, and the former inode area of "file A" is released from the first memory area. Further, a new data area of "file A" is established within the second memory area, and the former data area of "file A" is released from the first memory area.

Similarly, where "file B" is transferred from the second memory area composed of the second type of medium (ATA) to the first memory area composed of the first type of medium (FC), after the transfer process, an association between "file B" and a new inode is added to the directory information within the first memory area, and the association between "file B" and the former inode is deleted from the directory information within the second memory area. Additionally, a new inode area of "file B" is established within the first memory area, and the former inode area of "file B" is released from the second memory area. Further, a new data area of "file B" is established within the first memory area, and the former data area of "file B" is released from the second memory area.

As described hereinabove, in this embodiment, as in the first embodiment, one filesystem is built on an integrated LU. A plurality of block groups are then established in the integrated LU, but are established such that the each block group does not span the first memory area and second memory area. Thus, during creation of a new file or file transfer, the actual data of the file is not stored spanning the first memory area and the second memory area (in other words, spanning the first type of medium and the second type of medium), and within one filesystem files are distributed to the first memory area or second memory area, in file units. Accordingly, files can be stored to the appropriate type of medium depending on their value, and as a result it is possible to utilize a plurality of types of media efficiently.

In this embodiment, like the first embodiment, capacity management, copying of data in filesystem units, and application of snapshot function can be carried out easily.

In particular, in this embodiment, block groups of a first type capable of storing metadata are established in both the first memory area composed of the relatively expensive first medium (FC) and the second memory area composed of the relatively inexpensive second medium (ATA). In the first embodiment, on the other hand, block groups of a first type capable of storing metadata are established only in the relatively expensive first type of medium (FC). Thus, in this embodiment, the per-bit cost entailed in storage of metadata can be reduced in comparison to the first embodiment.

Figure 16:
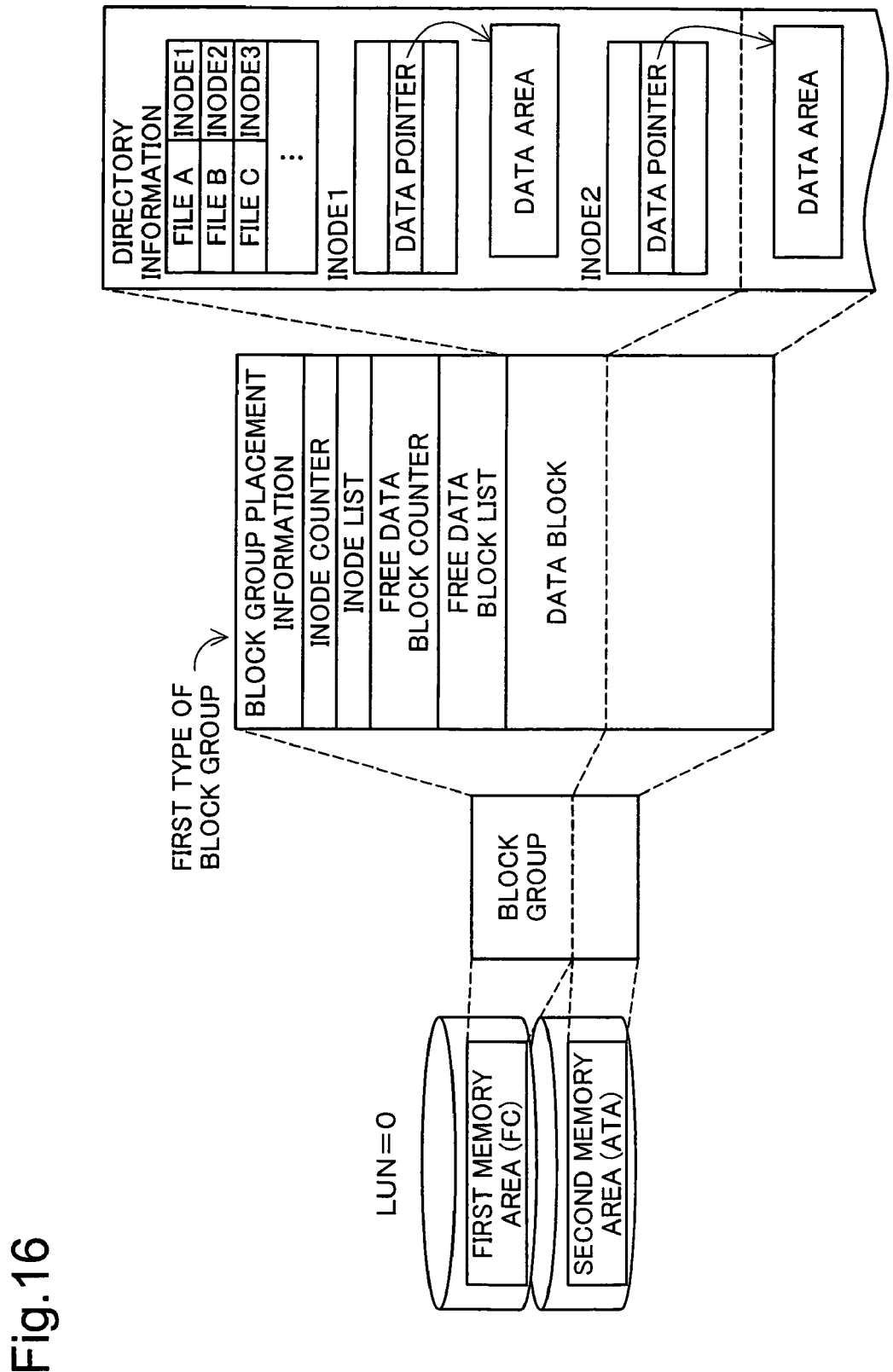
FIG. 16 shows structure of a filesystem on the first LU (LUN=0) in the third embodiment.

C. Third Embodiment:

FIG. 16 shows the structure of a filesystem on the first LU (LUN=0) in the third embodiment, and corresponds to FIG. 8. In FIG. 16, block group created on the first LU is modified, as compared to FIG. 8. Specifically, in the first LU, only a single block group (first type of block group) is created. That is, in this embodiment, there is established a block group that spans two memory areas.

However, as will be discussed later, in this embodiment, block group placement information and other such information other than data block (hereinafter termed "non-data block information") is stored only in the first memory area. Also, while the data block spans two memory areas, metadata is stored only in the first memory area.

In this embodiment, as in the first embodiment, creation of the filesystem may be executed according to the procedure depicted in FIG. 5. As in the first embodiment, in this embodiment, there are specified usages to the effect that metadata is stored to the first type of medium (FC), and metadata is not stored to the second type of medium (ATA). Additionally, in this embodiment, there are specified usages to the effect that only a single block group is created, and non-data block information is stored to the first type of medium (FC) and is not stored to the second type of medium (ATA). As a result, in this embodiment, the filesystem depicted in FIG. 16 is created in the first LU (LUN=0). In this embodiment, the content of the volume management table obtained in Step S114 is the same as that in the first embodiment (FIG. 7).

In the first and second embodiments, each block group is established so as to not span the two types of media. The free data block list of each block group is capable of assigning only free space in the address range of that particular block group, to the inode area and data area. That is, in the first and second embodiments, once a block group has been selected depending on the type of medium for storage, and an inode area and data area have been acquired from the corresponding free data block list, the areas will be areas composed of the intended type of medium. In this embodiment, however, the single block group is established so as to span the two types of media. Thus, in this embodiment, even where an inode area and data area have been acquired from the free data block list of the single block group, it will be unclear which of the types of medium make up the areas. Accordingly, in this embodiment, the new file creation process and file transfer process are modified in the manner discussed below. Specifically, in this embodiment, the starting address and ending address of the "type of medium of the first memory area" (memory area capable of storing metadata) and the starting address and ending address of the "type of medium of the second memory area" (memory area not capable of storing metadata) in the volume management table are recognized and distinguished by the file server. By so doing, despite the block group being established spanning two types of media, the file server can store a file in a specific area.

Figure 17:
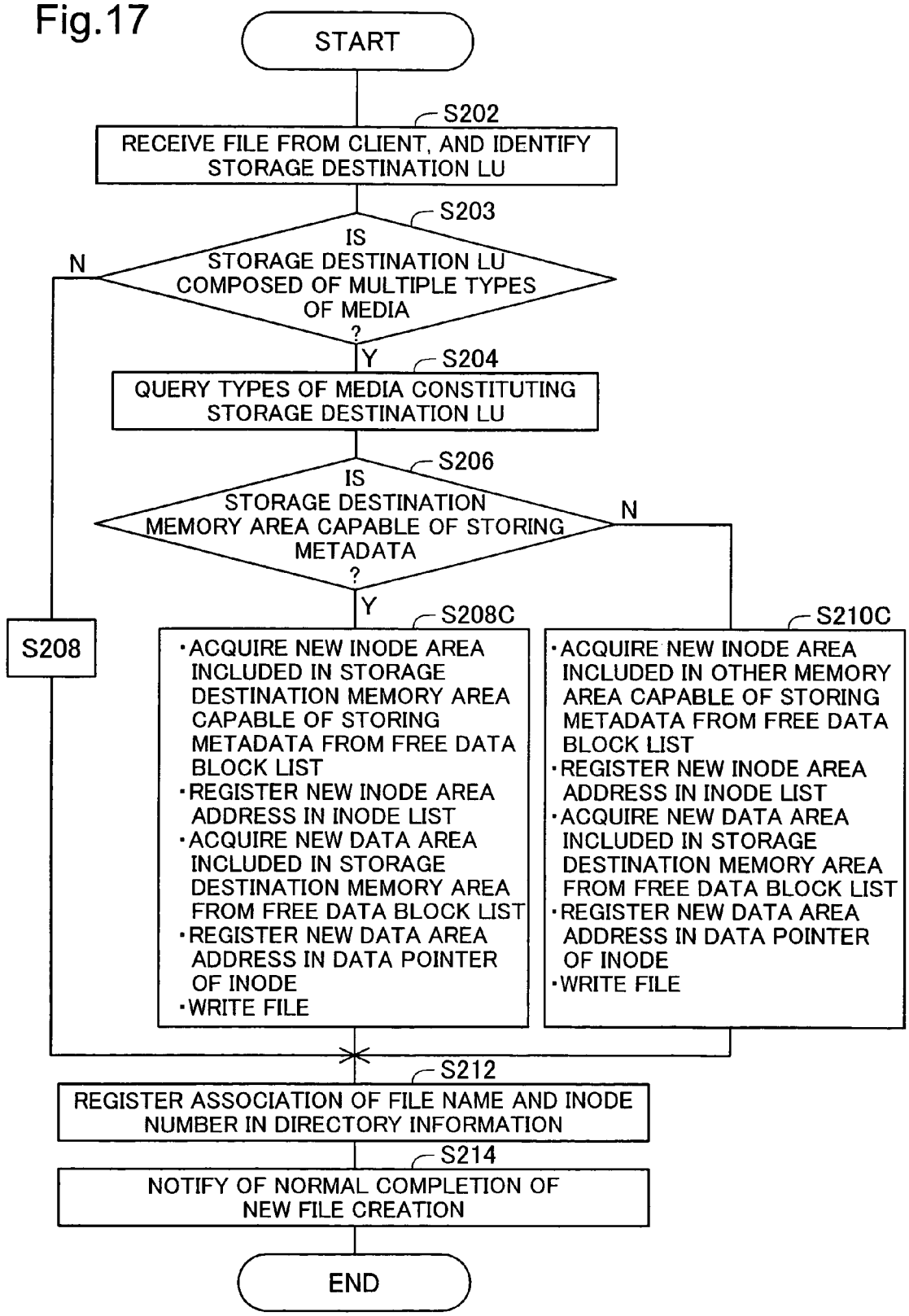
FIG. 17 is a flowchart depicting the procedure for creating a new file in an LU.

FIG. 17 is a flowchart depicting the procedure for creating a new file in an LU. While FIG. 17 is similar to FIG. 9, Steps S208C and S210C are modified. In addition, if a negative decision is made in Step S203, the routine proceeds to the same Step S208 as in FIG. 9.

Step S208C is executed if the storage destination LU is an integrated LU composed of multiple types of media, and the storage destination memory area is capable of storing metadata (e.g. where the storage destination LU is the first LU (LUN=0) of FIG. 16, and the storage destination memory area is the first memory area composed of the first type of medium (FC)).

In Step S208C, the filesystem controller 126 creates an inode and writes the actual data of the file to the storage destination memory area (e.g. the first memory area in FIG. 16).

Specifically, first, in the single block group of the integrated LU, a new inode area is acquired from the free data block list, and the address of the new inode area is registered in the inode list. It is necessary that the new inode area be secured within a memory area capable of storing metadata. Thus, the filesystem controller 126, referring to the volume management table TB, acquires as the new inode area an area contained within the address range of a storage destination memory area capable of storing metadata.

Next, in the single block group of the integrated LU, a new data area is acquired from the free data block list, and the address of the new data area is registered in the data pointer of the inode. During this process, the filesystem controller 126, referring to volume management table TB, acquires as the new data area an area contained within the address range of the storage destination memory area. The actual data of the file is then written to the new data area.

Step S210C, on the other hand, is executed if the storage destination LU is an integrated LU composed of multiple types of media, and the storage destination memory area is not capable of storing metadata (e.g. where the storage destination LU is the first LU (LUN=0) of FIG. 16, and the storage destination memory area is the second memory area composed of the second type of medium (ATA)).

In Step S210C, the filesystem controller 126 creates an inode in another memory area (e.g. the first memory area in FIG. 16) capable of storing metadata but different from the storage destination memory area (e.g. the second memory area in FIG. 16), and write the actual data of the file to the storage destination memory area Specifically, first, in the single block group of the integrated LU, a new inode area is acquired from the free data block list, and the address of the new inode area is registered in the inode list. During this process, the filesystem controller 126, referring to the volume management table TB, acquires as the new inode area an area contained within the address range of the other memory area capable of storing metadata.

Next, in the single block group of the integrated LU, a new data area is acquired from the free data block list, and the address of the new data area is registered in the data pointer of the inode. During this process, the filesystem controller 126, referring to the volume management table TB, acquires as the new data area an area contained within the address range of the storage destination memory area. The actual data of the file is then written to the new data area.

In FIG. 16, as in FIG. 8, the actual data and metadata of "file A" are stored in the first memory area. Also, in the same manner as FIG. 8, the actual data and metadata of "file B" are stored in the second memory area. However, whereas in FIG. 8 the actual data and metadata of "file B" are stored in different block groups, in FIG. 16 they are stored in the single block group.

Figure 18:
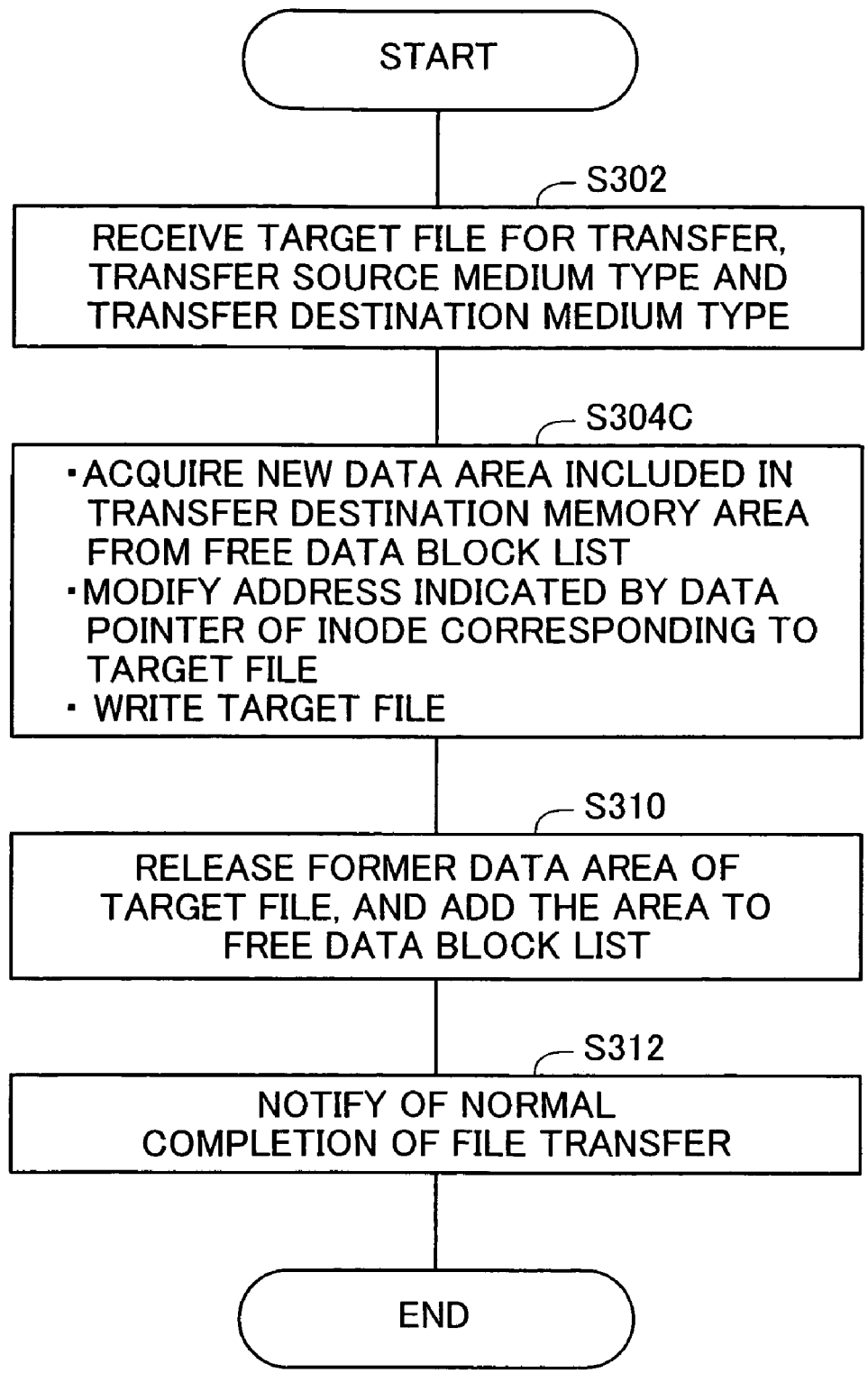
FIG. 18 is a flowchart depicting the procedure when transferring a file within an integrated LU in the third embodiment.

FIG. 18 is a flowchart depicting the procedure when transferring a file within the integrated LU in the third embodiment, and corresponds to FIG. 10. While FIG. 18 is similar to FIG. 10, Step S304C is modified.

In Step S304C, the filesystem controller 126 writes the actual data of the target file for transfer to the transfer destination memory area, and modifies the content of the inode corresponding to the target file for transfer.

Specifically, in the single block group of the integrated LU, a new data area is acquired from the free data block list. During this process, the filesystem controller 126, referring to the volume management table TB, acquires as the new data area an area contained within the address range of the transfer destination memory area. The address indicated by the data pointer of the inode corresponding to the target file is modified from the address of the former data area to the address of the new data area.

The actual data of the target file for transfer is then read out from the former data area within the transfer source memory area, and is written to the new data area of the transfer destination memory area.

Note that, in Step S310, as described in FIG. 10, the former data area of the transfer source memory area, in which the actual data of the target file for transfer still remains, is released.

Figure 19:
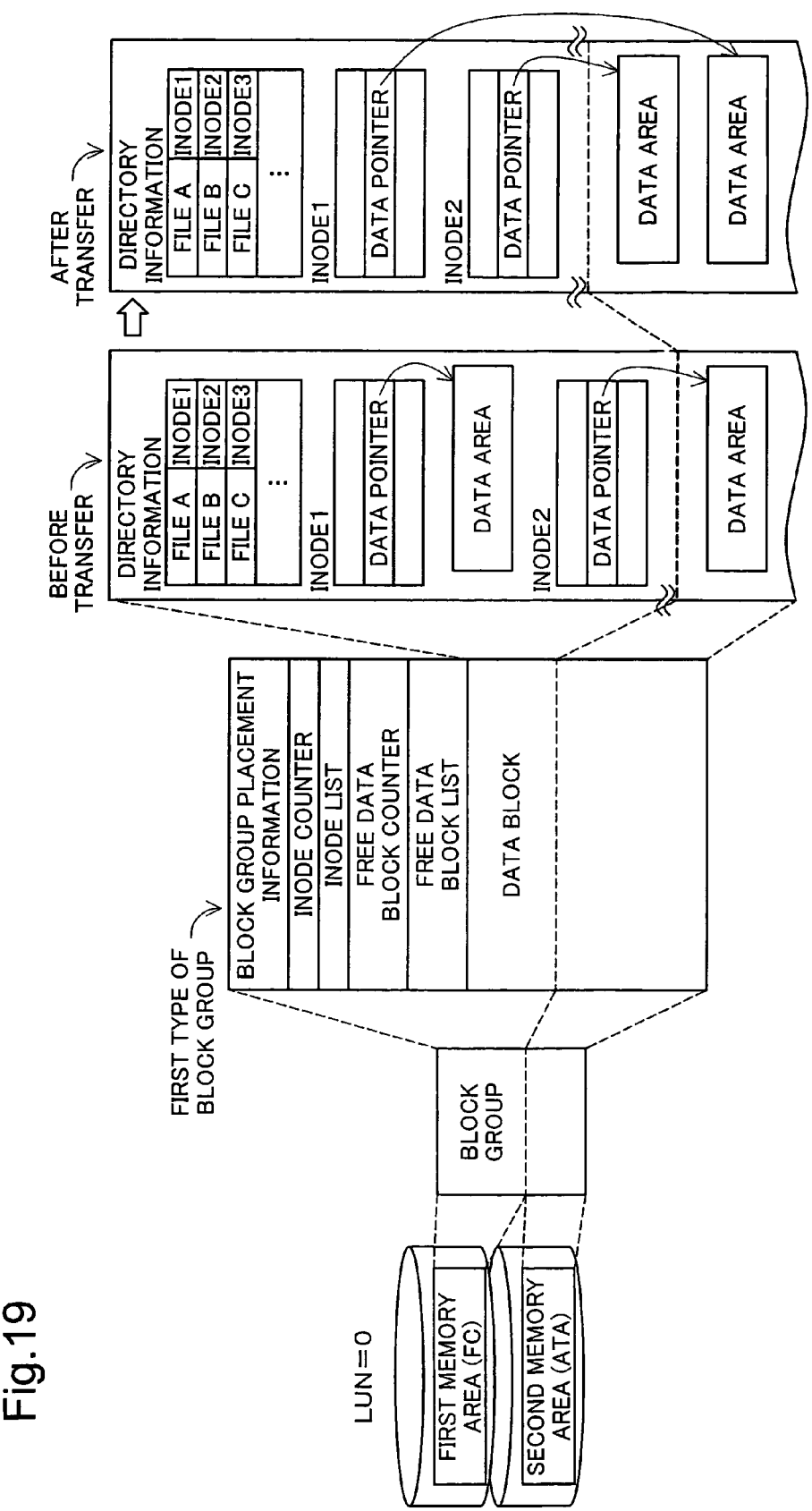
FIG. 19 shows structure of the filesystem before and after the file transfer process in the third embodiment.

FIG. 19 shows the structure of the filesystem before and after the file transfer process in the third embodiment. While FIG. 19 is similar to FIG. 16, a diagram of the data block interior after the transfer process is added.

In FIG. 19, "file A" is being transferred from the first memory area composed of the first type of medium (FC) to the second memory area composed of the second type of medium (ATA). After the transfer process, there is established within the second memory area a new data area storing the actual data of "file A", while the former data area in which the actual data of "file A" was stored previously is released from the first memory area. The address indicated by the data pointer of "inode1" is modified from the address of the former data area to the address of the new data area. Note that, the directory information is not modified.

Similarly, where "file B" is being transferred from the second memory area composed of the second type of medium (ATA) to the first memory area composed of the first type of medium (FC), after the transfer process, there is established within the first memory area a new data area storing the actual data of "file B", while the former data area in which the actual data of "file B" was stored previously is released from the second memory area. The address indicated by the data pointer of "inode2" is modified from the address of the former data area to the address of the new data area. Note that, the directory information is not modified.

In the above manner, in this embodiment as in the first embodiment, since metadata is stored only in the first memory area composed of the first type of medium (FC), when transferring a file, it is sufficient to modify the metadata relating to the file, rather than creating it anew.

As described hereinabove, in this embodiment, as in the first embodiment, one filesystem is built on an integrated LU. In this embodiment, however, only a single block group is established within the integrated LU, and the block group is established so as to span the first memory area and second memory area. Accordingly, in this embodiment, by means of referring to the volume management table TB, metadata regarding to a file is stored in the first memory area only, while the actual data of the file is stored in one of the appropriate memory areas only. Thus, in this embodiment as well, when creating a new file or transferring a file, the actual data of the file is not stored spanning the first memory area and the second memory area (in other words, spanning the first type of medium and the second type of medium), and within one filesystem files are distributed to the first memory area or second memory area, in file units. Accordingly, files can be stored to the appropriate type of medium depending on their value, and as a result it is possible to utilize multiple types of media efficiently.

In this embodiment, like first embodiment, capacity management, copying of data in filesystem units, and application of snapshot function can be carried out easily.

In particular, in this embodiment, since a filesystem having structure similar to a general purpose filesystem is built on the integrated LU, there is the advantage that a client 400 can refer to the filesystem built in the storage unit 130 directly, without going through the file server 110.

The invention is not limited to the above examples and embodiments set forth hereinabove, and can be reduced to practice in various ways without departing from the spirit thereof, such as the following variations, for example.

(1) In the embodiments hereinabove, multiple memory areas composed of multiple types of media are integrated using functions of the storage unit 130 (more specifically, the second configuration manager 154), and a filesystem is built on the resultant integrated memory area (integrated LU). However, instead of this, another method may be employed. For example, where the file server 110 is equipped with a logical volume manager (computer program), multiple memory areas composed of multiple types of media may be integrated using functions of the logical volume manager, and a filesystem built on the resultant integrated memory area. Alternatively, where a virtualization switch is utilized, multiple memory areas composed of multiple types of media within a plurality of storage devices may be integrated using functions of the virtualization switch, and a filesystem built on the resultant integrated memory area.

Whereas in the preceding embodiments, an FC compatible hard disk and an ATA compatible hard disk are used as media, other media may be used as well. For example, an optical disk, magnetooptical disk, or magnetic tape may be used as well.

In general, one filesystem will be built on an integrated memory area that includes a first memory area composed of at least part of first type of storage medium and a second memory area composed of at least part of second type of storage medium.

(2) Whereas in the preceding embodiments, the file distribution controller 214 is disposed in the management server 200, it could instead be disposed in the file server 110. By so doing, during the new file creation process (or file transfer process) the file server 110 can determine the type of storage destination medium (or the target file for transfer and the type of transfer destination medium).

Also, in the preceding embodiments the management server 200 comprises the file distribution controller 214, and the file server 110 receives the type of storage destination medium or target file for transfer etc. from the management server 200 during the new file creation process or file transfer process (more specifically, in Step S204 or S302), respectively. But it could instead be designed that the file server 110 receives a distribution rule from the management server.

Additionally, whereas in the preceding embodiments, during the new file creation process the type of storage destination medium is determined by the file distribution controller 214, the type of storage destination medium could instead be specified by the client 400, when the file is sent by the client 400.

Also, whereas in the preceding embodiments, during the file transfer process the target file for transfer etc. are determined by the file distribution controller 214, the target file for transfer etc. could instead be specified by the client 400.

Whereas in the embodiments hereinabove, the management server 200 and the management terminal 300 are constituted as different devices, the storage system and the management terminal could be constituted as the same device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A file server coupled to a storage unit having a plurality of storage mediums including at least one first type storage medium and at least one second type storage medium of which access time is lower than access time of the at least one first type storage medium, the file server comprising:
   a network interface for communicating with a client computer; and
   a file manager for managing files stored in a plurality of logical units corresponding to a plurality of file systems, respectively, in the storage unit,
   wherein the file manager configures at least one file system of the plurality of file systems, in an integrated logical unit including both the at least one first type storage medium and the at least one second type storage medium,
   wherein the network interface receives a first write request of a first file of the file system related to the integrated logical unit from the client computer, the first file including first data and first metadata, the first metadata including a first file name and first inode information,
   wherein the file manager registers the first metadata of the first file to the at least one first type storage medium, and writes the first data of the first file to the at least one first type storage medium, which are selected based on a distribution rule to be set depending on a file value,
   wherein the network interface receives a second write request of a second file of the file system from the client computer, the second file including second data and second metadata, the second metadata including a second file name and second inode information,
   wherein the file manager registers the second metadata of the second file to the at least one first type storage medium, and writes the second data of the second file to the at least one second type storage medium, which are selected based on the distribution rule,
   wherein when a changed said file value of the first file in the integrated logical unit causes storage of the first file within the at least one first type storage medium to become conflicted with the distribution rule of the first file, the file manager moves the first data in the first file from the at least one first type storage medium to the at least one second type storage medium within a same said integrated logical unit, and modifies the first metadata already stored in the at least one first type storage medium, so as to point to a location of the actual data of the at least one second type storage medium.

2. The file server as claimed in claim 1, wherein the distribution rule is established utilizing a file name, last update time of the file, file creator, period of time for with the file is stored within the storage system, a current day of the week, or a current time of day.

3. The file server as claimed in claim 1, wherein with regard to the plurality of logical units and the plurality of file systems, each logical unit is used exclusively by a single corresponding file system.

4. The file server as claimed in claim 1, wherein the file manager configures the at least one file system of the plurality of file systems, in the integrated logical unit to include both: a distributed first type storage medium formed of exclusive plural storage medium portions of plural first type storage mediums, respectively; and, a distributed second type storage medium formed of exclusive plural storage medium portions of plural second type storage mediums, respectively.

5. A file server coupled to a storage unit having a plurality of storage mediums including a first storage area configured by at least one first type storage medium and a second storage area configured by at least one second type storage medium of which access time is lower than access time of the at least one first type storage medium, the file server comprising:
   a network interface for communicating with a client computer; and
   a file manager for managing files stored in a plurality of logical units corresponding to a plurality of file systems, respectively, in the storage unit,
   wherein the file manager configures at least one file system of the plurality of file systems, in an integrated logical unit including both the first storage area and the second storage area,
   wherein the network interface receives a first write request of a first file of the file system related to the integrated logical unit from the client computer, the first file including first data and first metadata, the first metadata including a first file name and first inode information,
   wherein the file manager selects the first storage area based on a distribution rule to be set depending on a file value, and stores the first data to the selected first storage area, and registers the first metadata to the first storage area,
   wherein the network interface receives a second write request of a second file of the file system from the client computer, the second file including second data and second metadata, the second metadata including second file name and second inode information, and
   wherein the file manager selects the second storage area based on the distribution rule, and stores the second data to the selected second storage area, and registers the second metadata to the first storage area,
   wherein when a changed said file value of the first file in the integrated logical unit causes storage of the first file within the at least one first type storage medium to become conflicted with the distribution rule of the first file, the file manager moves the first data in the first file from the at least one first type storage medium to the at least one second type storage medium within a same said integrated logical unit, and modifies the first metadata already stored in the at least one first type storage medium, so as to point to a location of the actual data of the at least one second type storage medium.

6. The file server as claimed in claim 5, wherein the distribution rule is established utilizing a file name, last update time of the file, file creator, period of time for with the file is stored within the storage system, a current day of the week, or a current time of day.

7. The file server as claimed in claim 5, wherein with regard to the plurality of logical units and the plurality of file systems, each logical unit is used exclusively by a single corresponding file system.

8. The file server as claimed in claim 5, wherein the file manager configures the at least one file system of the plurality of file systems, in the integrated logical unit to include both: a distributed first type storage medium formed of exclusive plural storage medium portions of plural first type storage mediums, respectively; and, a distributed second type storage medium formed of exclusive plural storage medium portions of plural second type storage mediums, respectively.

9. A method useable within a file server coupled to a storage unit having a plurality of storage mediums including at least one first type storage medium and at least one second type storage medium of which access time is lower than access time of the at least one first type storage medium, the method comprising:

communicating with a client computer via a network interface; and managing files stored in a plurality of logical units corresponding to a plurality of file systems, respectively, in the storage unit via a file manager, configuring at least one file system of the plurality of file systems, in an integrated logical unit which includes both the at least one first type storage medium and the at least one second type storage medium, receiving a first write request of a first file of the file system related to the integrated logical unit from the client computer, the first file including first data and first metadata, the first metadata including a first file name and first inode information, registering the first metadata of the first file to the at least one first type storage medium, writing the first data of the first file to the at least one first type storage medium which is selected based on a distribution rule to be set depending on a file value, receiving a second write request of a second file of the file system from the client computer, the second file including second data and second metadata, the second metadata including a second file name and second inode information, registering the second metadata of the second file to the at least one first type storage medium, writing the second data of the second file to the at least one second type storage medium, which is selected based on the distribution rule, and wherein when a changed said file value of the first file in the integrated logical unit causes storage of the first file within the at least one first type storage medium to become conflicted with the distribution rule, moving the first data in the first file from the at least one first type storage medium to the at least one second type storage medium within a same said integrated logical unit, and modifying the first metadata already stored in the at least one first type storage medium, so as to point to a location of the actual data of the at least one second type storage medium.

10. A method useable within a file server coupled to a storage unit having a plurality of storage mediums including a first storage area configured by at least one first type storage medium and a second storage area configured by at least one second type storage medium of which access time is lower than access time of the at least one first type storage medium, the method comprising:

communicating with a client computer via a network interface; and managing files stored in a plurality of logical units corresponding to a plurality of file systems, respectively, in the storage unit via a file manager, configuring at least one file system of the plurality of file systems, in an integrated logical unit including both the first storage area and the second storage area, receiving a first write request of a first file of the file system related to the integrated logical unit from the client computer, the first file including first data and first metadata, selecting the first storage area for storing the first data of the first file based on a distribution rule to be set depending on a file value, storing the first data of the first file to the selected first storage area, registering the first metadata to the first storage area, receiving a second write request of a second file of the file system from the client computer, the second file including second data and second metadata, selecting the second storage area for storing the second data of the second file based on the distribution rule, storing the second data of the second file to the selected second storage area, registering the second metadata to the first storage area, wherein when a changed said file value of the first file in the integrated logical unit causes storage of the first file within the at least one first type storage medium to become conflicted with the distribution rule of the first file, moving the first data in the first file from the at least one first type storage medium to the at least one second type storage medium within a same said integrated logical unit, and modifying the first metadata already stored in the at least one first type storage medium, so as to point to a location of the actual data of the at least one second type storage medium.

* * * * *